(12) United States Patent
Kobayashi

(10) Patent No.: US 6,385,142 B1
(45) Date of Patent: May 7, 2002

(54) POSITION CONTROL DEVICE FOR USE IN LIBRARY DEVICE AND METHOD THEREOF

(75) Inventor: Manabu Kobayashi, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/901,016

(22) Filed: Jul. 25, 1997

(30) Foreign Application Priority Data

Nov. 26, 1996 (JP) .............................................. 8-314413

(51) Int. Cl.$^7$ ................................................ G11B 17/22
(52) U.S. Cl. ............................ 369/30; 369/36; 369/178
(58) Field of Search ............................... 369/30, 34, 35, 369/36, 38, 191, 194, 178, 192; 360/92, 98.01, 98.04, 75.1, 75.2

(56) References Cited

U.S. PATENT DOCUMENTS 5,426,581 A * 6/1995 Kishi et al. ............ 364/167.01
5,781,367 A * 7/1998 Searle et al. .................. 360/92

FOREIGN PATENT DOCUMENTS

| EP | 0 389 159 A3 | * | 3/1990 |
| EP | 0 389 159 A2 | * | 3/1990 |
| JP | 476851 | | 3/1992 |
| WO | WO 96/13355 | * | 5/1996 |

* cited by examiner

Primary Examiner—Ali Neyzari
(74) Attorney, Agent, or Firm—Greer, Burns & Crain, Ltd.

(57) ABSTRACT

A controlling unit of a library device scans a home position and each stop position by driving a picker unit upward and downward, and controls the position of the picker unit using an average value of two position data. Additionally, the controlling unit measures an entire stroke of a hand unit attached to the picker unit, and corrects the stop position of the hand unit using a ratio of an actually measured value to a design value.

25 Claims, 27 Drawing Sheets

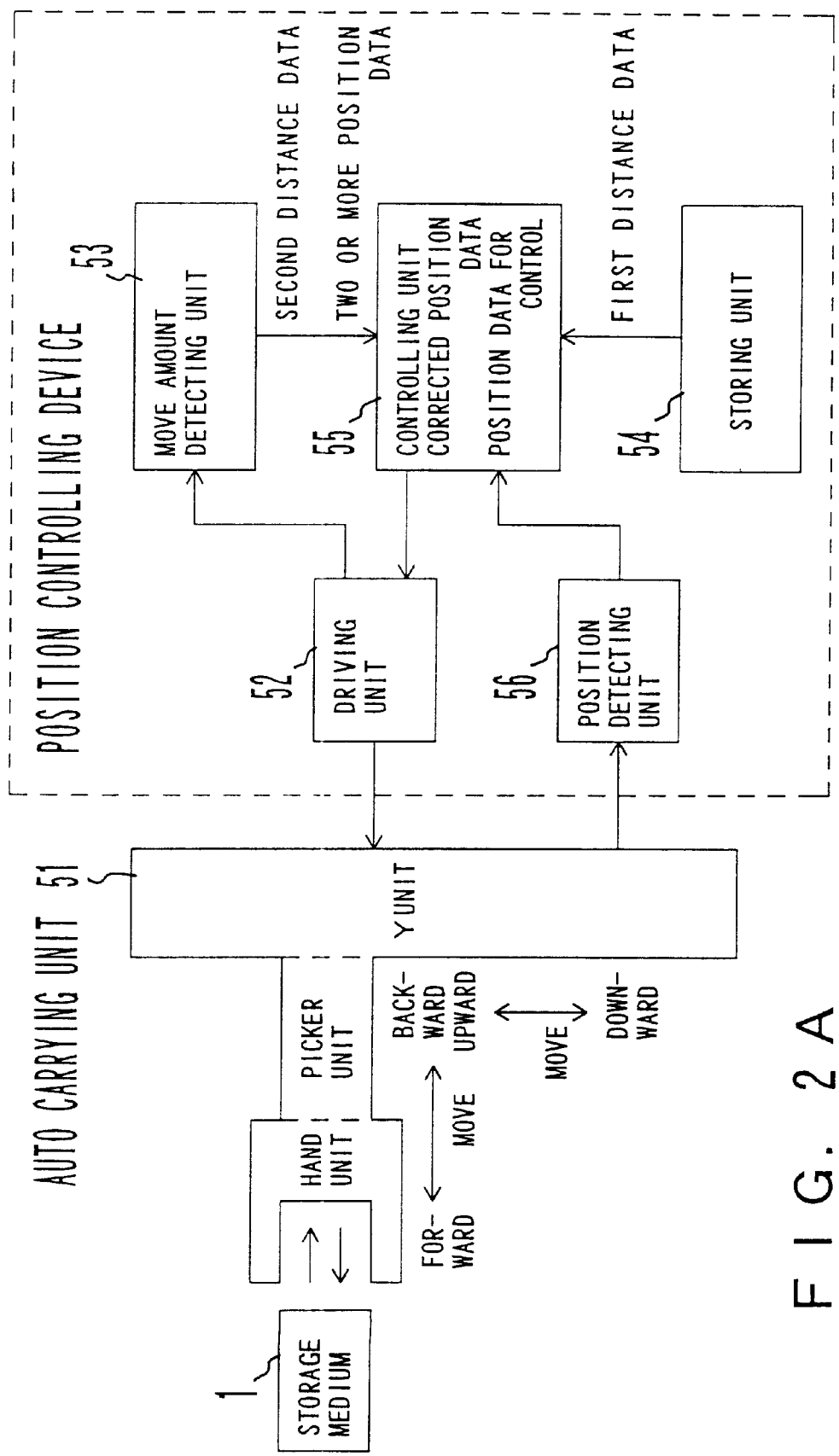
F I G. 2A

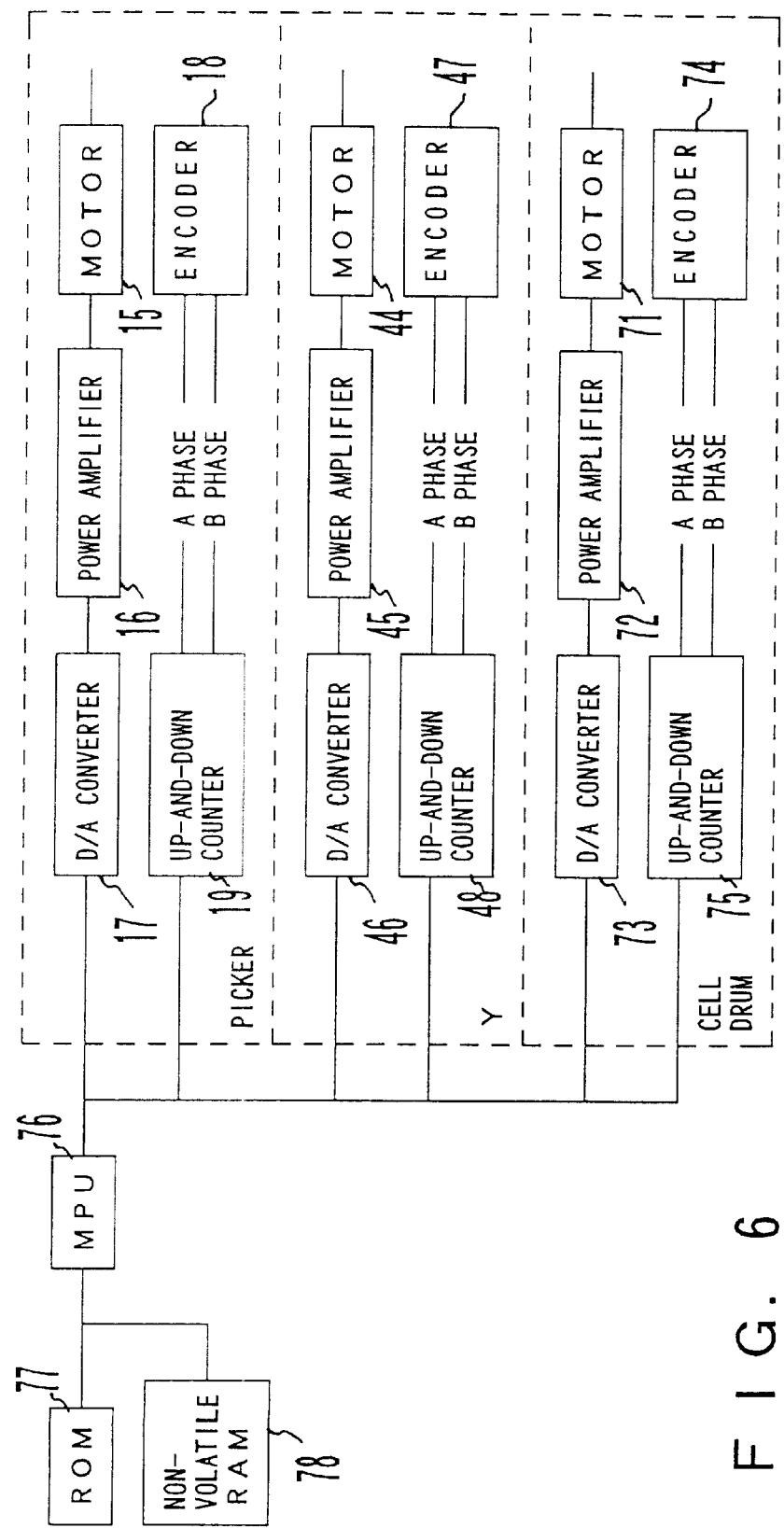
F I G. 6

| POSITION | DESIGN VALUE | ACTUALLY MEASURED VALUE | ESTIMATION VALUE |
|---|---|---|---|
| BACK END | Xps1 | Xpm1 | — |
| CLOSED | Xps2 | — | Xpc2 |
| OPEN | Xps3 | — | Xpc3 |
| FRONT END | Xps4 | Xpm4 | — |

F I G. 7

| POSITION | (1) COUNTER VALUE WHEN UPWARD SCANNING IS ON | (2) COUNTER VALUE WHEN UPWARD SCANNING IS OFF | (3) COUNTER VALUE WHEN DOWNWARD SCANNING IS ON | (4) COUNTER VALUE WHEN DOWNWARD SCANNING IS OFF | (5) MIDDLE VALUE BETWEEN (1) AND (3) | (6) MIDDLE VALUE BETWEEN (2) AND (4) | (7) MIDDLE VALUE BETWEEN (5) AND (6) |
|---|---|---|---|---|---|---|---|
| DRIVE D1 | Xonu(0) | Xofu(0) | Xond(0) | Xofd(0) | Xon(0) | Xof(0) | X(0) |
| DRIVE D2 | Xonu(1) | Xofu(1) | Xond(1) | Xofd(1) | Xon(1) | Xof(1) | X(1) |
| DRIVE D3 | Xonu(2) | Xofu(2) | Xond(2) | Xofd(2) | Xon(2) | Xof(2) | X(2) |
| DRIVE D4 | Xonu(3) | Xofu(3) | Xond(3) | Xofd(3) | Xon(3) | Xof(3) | X(3) |
| CELL C1 | Xonu(4) | Xofu(4) | Xond(4) | Xofd(4) | Xon(4) | Xof(4) | X(4) |
| CELL C2 | Xonu(5) | Xofu(5) | Xond(5) | Xofd(5) | Xon(5) | Xof(5) | X(5) |
| CELL C3 | Xonu(6) | Xofu(6) | Xond(6) | Xofd(6) | Xon(6) | Xof(6) | X(6) |
| ... | | | | | | | |
| CELL C28 | Xonu(31) | Xofu(31) | Xond(31) | Xofd(31) | Xon(31) | Xof(31) | X(31) |
| CELL C29 | Xonu(32) | Xofu(32) | Xond(32) | Xofd(32) | Xon(32) | Xof(32) | X(32) |
| CELL C30 | Xonu(33) | Xofu(33) | Xond(33) | Xofd(33) | Xon(33) | Xof(33) | X(33) |
| CAS | Xonu(34) | Xofu(34) | Xond(34) | Xofd(34) | Xon(34) | Xof(34) | X(34) |

| POSITION | (1) COUNTER VALUE WHEN DOWNWARD SCANNING IS ON | (2) COUNTER VALUE WHEN UPWARD SCANNING IS OFF | MIDDLE VALUE BETWEEN (1) AND (2) |
|---|---|---|---|
| HOME POSITION | 0 (RESET) | Xhome | Xhome2 |

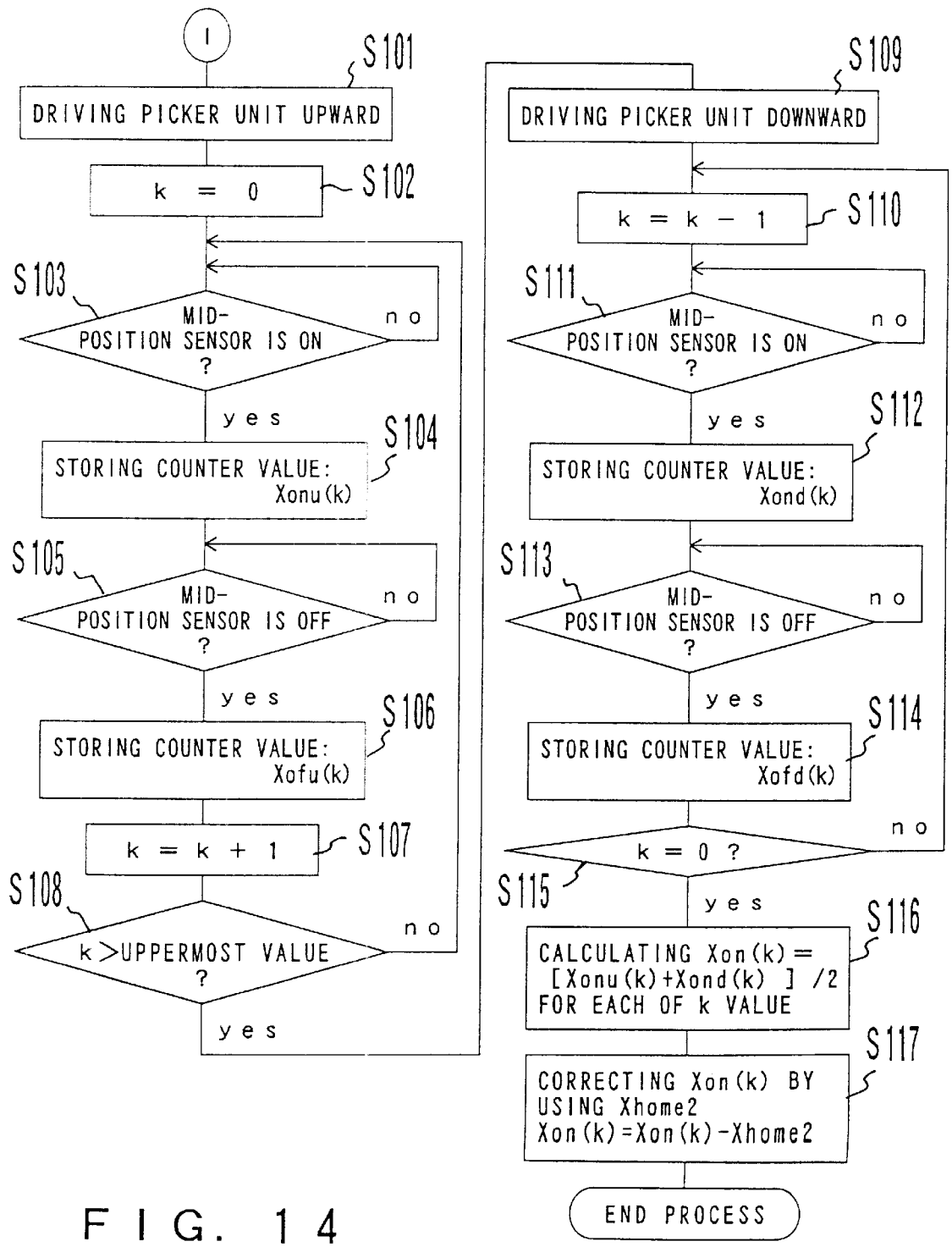
F I G. 1 4

POSITION CONTROL DEVICE FOR USE IN LIBRARY DEVICE AND METHOD THEREOF

BACKGROUND OF THE INVENTION

1. Field of the Invention

The present invention relates to a library device for automatically loading, unloading, keeping, recording data in, reproducing data of, etc. storage media, to a position control device for obtaining position information of a mechanism unit required for transporting storage media and determining a stop position, and to a method thereof.

2. Description of the Related Art

A library device today is used as, for example, a jukebox. It automatically performs loading/unloading, keeping, recording data in/reproducing data of, etc. storage media. Optical disks, MTs (Magnetic Tapes), CD-ROMs (Compact Disk-Read Only Memories), etc. are used as the storage media.

The library device normally comprises a cartridge access station (CAS) for loading/unloading storage media, a plurality of cells for storing the storage media, a drive unit for recording data in/reproducing data of a storage medium, and an accessor for transporting the storage medium between each of the components. The accessor comprises a hand unit for holding a storage medium, a picker mechanism unit (picker unit) for moving the hand unit holding the storage medium backward and forward, and a Y-axis mechanism unit (Y unit) for moving the picker unit upward and downward.

FIG. 1A shows a picker unit and its peripheral hardware in a conventional optical disk library device. In this figure, a storage medium 1, cell 2, picker unit 3, and a hand unit 4, are depicted as a top view; gears 8, 9, and 10 are depicted as a side view; and a driving unit 11, move amount detecting unit 12, controlling unit 13, and a storing unit 14 are depicted as a block diagram. The picker unit 3 comprises pulleys 5 and 7, and a belt 6 arranged between the pulleys 5 and 7.

An MPU (Micro Processing Unit) 20 included in the controlling unit 13 performs feedback control of the driving unit 11 according to a program stored in a ROM (Read Only Memory) 21 in the storing unit 14. The driving unit 11 includes a picker motor 15, power amplifier 16, and a D/A converter 17. The motor 15 is driven according to a control signal from the MPU 20, and rotates the gear 10. As a result, power is transmitted to the pulley 7 via the gears 8 and 9.

When the pulley 7 rotates, the hand unit 4 holding the storage medium 1 moves backward and forward, and the fingers of the hand unit 4 open/close as the hand unit 4 moves backward and forward. A section during which the fingers are closed (closed section), and a section during which the fingers are open (open section) are included in a stroke of the hand unit 4. The MPU 20 controls the hand unit 4 in order to stop it in each of the sections. The hand unit 4 holds or releases the storage medium 1 in the cell 2 according to a combination of the sections.

FIG. 1B shows a load end at which a rotary motion of the motor 15 is converted into a linear motion of the hand unit 4. In this figure, a gear 8' is securely disposed on the rotation shaft of the gear 8. Rotation is transmitted to the pulley 7 via a gear 7' engaging with the gear 8'. A rotary motion of the pulley 7 is converted into a linear motion of the belt 6, which moves the hand unit 4 backward and forward. In this case, the gear 7' securely disposed on the rotation shaft of the pulley 7 corresponds to the load end.

FIG. 1C shows the position at which the hand unit 4 stays at the back end of its entire stroke (home position). FIG. 1D shows the position at which the hand unit 4 stays at the front end of its entire stroke (empty position). The fingers of the hand unit 4 are closed at the home position shown in FIG. 1C, and are open at the empty position shown in FIG. 1D.

FIG. 1E shows the closed section during which the fingers are closed, while FIG. 1F shows the open section during which the fingers are open. For the control of the picker unit 3, it is vital to stop the hand unit 4 with high accuracy at the position where the fingers are closed or open, which is close to the center of each of these sections.

The move amount detecting unit 12 comprises a two-phase (A- and B-phase) encoder 18, and an up-and-down counter circuit 19. The MPU 20 reads the value obtained by counting the number of pulses output from the encoder 18 by the up-and-down counter 19, thereby obtaining the amount of a move in the backward and forward directions of the hand unit 4.

An arbitrary encoder such as an optical encoder, magnetic encoder, etc. can be used as the encoder 18, which is a sensor for detecting a rotation angle of the motor 15. An encoder using a photo-interrupter is shown in FIG. 1G as an example. In FIG. 1G, the encoder 18 comprises a slit plate 22 which is securely disposed on the rotation shaft of the motor 15, and a photo-interrupter 23 peripheral to the slit plate 22.

The slit plate 22 has slits at predetermined intervals as shown in FIG. 1H. As the motor 15 rotates, two beams of light of A and B phases of the photo-interrupter 23 pass through the slits, or are interrupted by the slit plate 22. Each of output signals of the A and B phases of the photo-interrupter 23 becomes ON when a beam of light passes through, while it becomes OFF when the beam of light is interrupted. In this way, these output signals become pulse signals which cycle between ON and OFF.

The rotation angle of the motor 15 is obtained according to the number of pulses shown in FIG. 1I, and the corresponding amount of a move of the hand unit 4 is estimated. Additionally, there is a relative difference between an A-phase pulse and a B-phase pulse. The direction of the rotation of the motor 15 is determined according to the direction of this difference. If the direction of the rotation of the motor 15 is determined, the direction of the corresponding move of the hand unit 4 can be obtained.

However, since only a relative amount of a move can be obtained from the value of the up-and-down counter 19, the MPU 20 resets the up-and-down counter 19 at the home position shown in FIG. 1C. Thereafter, the MPU 20 controls the picker unit 3 using this position as a home reference, without resetting the counter value.

To reset the up-and-down counter 19, the MPU 20 slowly drives the hand unit 4 backward so as not to apply a load to the picker unit 3, when the device is powered up, verifies a position at which the counter value remains unchanged for a predetermined amount of time or more, and resets the up-and-down counter 19 at that position.

To move the hand unit 4 from the home position to the closed position shown in FIG. 1E, the MPU 20 must have the absolute count value of the closed position based on the reset value of the home position, as the information for specifying that position. This is similar to the case in which the hand unit 4 is moved to the open position shown in FIG. 1F.

A conventional library device stores the count values for specifying the length of the entire stroke shown in FIG. 1D, the closed position shown in FIG. 1E, and the open position shown in FIG. 1F, in the ROM 21 as design values, and controls the picker unit 3 using these values. Assuming that the design value of the home position shown in FIG. 1C is "0", the design values of the positions shown in FIGS. 1D, 1E, and 1F are respectively 211, 192, and 206.

FIG. 1J shows a Y unit and its peripheral hardware in a conventional optical disk library device. A Y flag 38, Y sensor 39, driving unit 40, move amount detecting unit 41, controlling unit 42, and a storing unit 43, as shown in FIG. 1J, are practically included in a library device 31. The Y unit comprises pulleys 35 and 37, and a belt 36 arranged between them, Y flag 38, and a Y sensor 39.

An MPU 49 included in the controlling unit 42 performs feedback control of the driving unit 40, by using a non-volatile RAM (Random Access Memory) 50' according to a program stored in a ROM 50 in a storing unit 43. The driving unit 40 includes a Y motor 44, power amplifier 45, and a D/A converter 46. It rotates the pulley 37 by driving the Y motor 44 according to a control signal from the MPU 49.

According to the rotation of the pulley 37, the picker unit 3 moves upward or downward. The picker unit 3 can be stopped at a desired position among the positions corresponding to the CAS 32, each of cells 2 in a cell drum 33, and each of drives 34. For the control of the Y unit, it is vital to stop the picker unit 3 with high accuracy at these positions.

The move amount detecting unit 41 includes a two-phase (A- and B-phase) encoder 47, and an up-and-down counter circuit 48. The MPU 49 reads a value obtained by counting the number of pulses output from the encoder 47 with the up-and-down counter 48, thereby obtaining the amount of a move of the picker unit 3 in the upward or downward directions. The structure of the encoder 47 is similar to that of the encoder 18 shown in FIG. 1A.

Since only a relative amount of a move is obtained according to the value of the up-and-down counter 48, the home position must be determined when the device is powered up. Therefore, a Y flag 38 pointing to each of the positions of the CAS 32, cells 2, and the drives 34 is arranged, and the Y sensor 39 is attached to the picker unit 3.

The Y flag 38 has a home position pattern indicating the home position. The MPU 49 resets the up-and-down counter 48 when detecting the edge of this pattern. Thereafter, the MPU 49 controls the Y unit using this position as a reference, without resetting the counter value.

Additionally, the Y flag 38 has a mid-position pattern and a θ rotation prohibition pattern in addition to the home position pattern. The area between both of the edges of the θ rotation prohibition pattern represents a range in which the picker unit 3 cannot rotate in the direction denoted with θ. Each of the slits of the mid-position pattern is assigned to each of the positions of the CAS 32, cells 2, and the drives 34, and indicates the position at which the storage medium 1 is permitted to be selected/restored.

The Y sensor 39 is equipped with a photo-interrupter sensor unit corresponding to each of the home position pattern, mid-position pattern, and the θ rotation prohibition pattern. An output signal from each photo-interrupter sensor becomes ON in an area, for example, a slit, through which a beam of light passes in each pattern, and becomes OFF in an area in which the beam of light is interrupted. The MPU 49 recognizes the position at which the output signal of each photo-interrupter sensor changes from ON to OFF, or the position at which the output signal changes from OFF to ON, as the edge position of each pattern.

If there is a radial error, for example, backlash in a load end which is a position at which a rotary motion of the motor 44 is converted into a linear motion, errors are accumulated as the number of rotations increases. Here, the load end corresponds to the pulley 37. If the motor 44 is driven based only on the information of the move amount detecting unit 41 in a state in which there is an error in the pulley 37, the positioning accuracy of the picker unit 3 is degraded.

Accordingly, in the conventional library device 31, a move distance is measured with the encoder 47, and each mid-position corresponding to a slit is detected with the Y sensor 39, so that an accurate counter value of a mid-position is obtained.

The MPU 49 scans the mid-position pattern using the edge of the home position pattern as a reference position, and obtains the counter values of the upper and lower edges of each of the slits. Then, the MPU 49 calculates the average value (middle value) of these two counter values, and uses the middle value of each of the slits as each stop position of the CAS 32, cells 2, and the drives 34.

FIG. 1K is a flowchart showing a process for determining a stop position of the picker unit 3. Once the process is started, the MPU 49 determines whether or not the current position is lower than the edge of the home position pattern (step S1). If "YES", the MPU 49 drives the picker unit 3 upward, and moves it higher than the edge (step S2).

Then, the MPU 49 drives the picker unit 3 downward (step S3), and determines whether or not the edge of the home position pattern is detected (step S4). If "YES", the MPU 49 resets the up-and-down counter 48, makes the picker unit 3 overrun the lowest mid-position (slit), and stops it (step S5). With this process, the edge position of the home position pattern is made to correspond to the counter value "0".

Then, the MPU 49 drives the picker unit 3 upward (step S6), and sets a control variable "k" indicating a stop position to "0" (step S7). The MPU 49 next determines whether or not the mid-position sensor is ON (step S8).

Here, as shown in FIG. 1L, "ON" of the mid-position sensor indicates that the point sensed by the Y sensor 39 exists in an area within a slit corresponding to any of the mid-positions. In the meantime, "OFF" of the mid-position sensor indicates that the point exists in an area outside a slit. "ON/OFF" of the mid-position sensor correspond to "ON/OFF" of an output signal of the Y sensor 39.

If the mid-position sensor becomes ON, the MPU 49 stores the counter value at that time in a RAM 50' as "Xonu(k)", and next determines whether or not the mid-position sensor is OFF (step S10). If the mid-position sensor becomes OFF, the MPU 49 stores the counter value at that time in the RAM 50' as "Xofu(k)" (step S11). Then, the MPU 49 sets "k=k+1" (step S12), and determines whether or not the value of "k" is larger than the uppermost value corresponding to the uppermost mid-position, that is, the number of slits minus one (step S13). If "NO", the MPU 49 repeats the process in and after step S8.

If the value of "k" is larger than the uppermost value in step S13, the MPU 49 calculates "X(k)=[Xonu(k)+Xofu(k)]/2" for each of the values of "k" from 0 to the uppermost value, obtains the middle values X(k) (step S14), and terminates the process.

If such a measurement of mid-positions is performed each time the device is powered up, an operator must wait for the duration of the measurement process. Accordingly, the obtained value of X(k) is stored in the RAM 50', as each of the stop positions corresponding to each of the CAS 32, cells 2, and the drives 34. Thereafter, no further measurement is performed until a fault occurs.

SUMMARY OF THE INVENTION

However, the above described conventional position determination method has the following problems.

Normally, there is a radial error of a load end of the picker unit 3 shown in FIG. 1B, and errors are accumulated as the number of rotations increases. Therefore, the stop position accuracy of the hand unit 4 is degraded.

Since the picker unit 3 is not equipped with a sensor for detecting a stop position of the hand unit 4, the stop position of the hand unit 4 is determined based only on a design value, as described earlier. That is, it is difficult to accurately stop the hand unit 4 at the closed/open position.

In the meantime, for the control of the Y unit, the Y sensor 39 is attached to the Y unit for detecting the position of the picker unit 3, in order to correct an error at the load end. However, the encoder 47 detecting the amount of a move is attached to the rotary motor shaft, and the Y sensor 39 scanning the mid-position pattern is attached to the picker unit 3 performing a linear motion.

Since there are static and dynamic backlashes between the rotary motion of the Y motor 44 and the linear motion of the picker unit 3, it is impossible to accurately obtain the middle value of each slit even if the position determination process, which is shown in FIG. 1K, is performed.

A static backlash indicates a play in the engagement of gears, etc., while the dynamic backlash indicates a stretch/long term change of a belt, engagement between a gear and a belt, distortion in a frame of the library device 31, etc. The dynamic backlash occurs while the picker unit 3, etc. are operating, and restores to an original state when the operation is stopped. In the meantime, the static backlash occurs when operation of the picker unit 3, etc. is stopped.

With the position determination process shown in FIG. 1K, the position of the picker unit 3 is measured while operating the picker unit 3. Accordingly, the measured value naturally includes dynamic backlash, and also a calculated middle value includes an error. Therefore, it is difficult to obtain an accurate stop position for the picker unit 3.

Also the operations for determining the home position (reference position) of the home position pattern corresponding to steps S1 through S5 of FIG. 1K, include a similar error. These operations are performed each time power is turned on, and are intended only for determining the home position. Therefore, even if they include dynamic backlash, this does not matter if the backlash is constant during the operations.

If the backlash fluctuates, the relative relationship between the counter value at the home position and the stored middle values will not be maintained, and stop positions will include an error. Since the dynamic backlash may often vary during operations, an error at the home position does not match an error at each stop position.

An object of the present invention is to provide a position controlling device for accurately determining a stop position of a mechanism of an accessor which transports a storage medium in a library device, and a method thereof.

The position controlling device according to the present invention stores a plurality of storage media, and is used in a library device which comprises an automatic transporting unit for transporting a storage medium. It comprises a driving unit, move amount detecting unit, storing unit, controlling unit, and a position detecting unit.

The operations of the position controlling device according to the first aspect of the present invention are described below.

The driving unit drives the automatic transporting unit, and the move amount detecting unit detects the amount of a move of the automatic transporting unit. The storing unit stores predetermined first distance data. The controlling unit corrects position data of the automatic transporting unit using the ratio of second distance data obtained from the move amount detecting unit to the first distance data, and controls the driving unit using the corrected position data.

The operations of the position controlling device according to the second aspect of the present invention are described below.

The driving unit drives the automatic transporting unit, and the move amount detecting unit detects the amount of a move of the automatic transporting unit. The position detecting unit detects a particular position of the automatic transporting unit. The controlling unit moves the automatic transporting unit in two or more directions. It generates position data for control using two or more position data which are respectively obtained from the move amount detecting unit when the particular position is detected in two or more directions, and controls the driving unit using the position data for control.

With such a position controlling device, an error at a load end, and an error due to a backlash, are eliminated, thereby accurately controlling a stop position of a mechanism of an accessor in a library device.

BRIEF DESCRIPTION OF THE DRAWINGS

FIG. 1I shows signals from the encoder;

FIG. 2A is a block diagram showing the principle of a position controlling device according to the present invention;

FIG. 6 is a block diagram showing a control/driving system;

FIG. 7 shows a first table;

FIG. 10 shows a second table;

FIG. 12 shows a third table;

FIG. 14 is a flowchart 2 showing the second process for determining a position.

DESCRIPTION OF THE PREFERRED EMBODIMENT

Figure 1A:
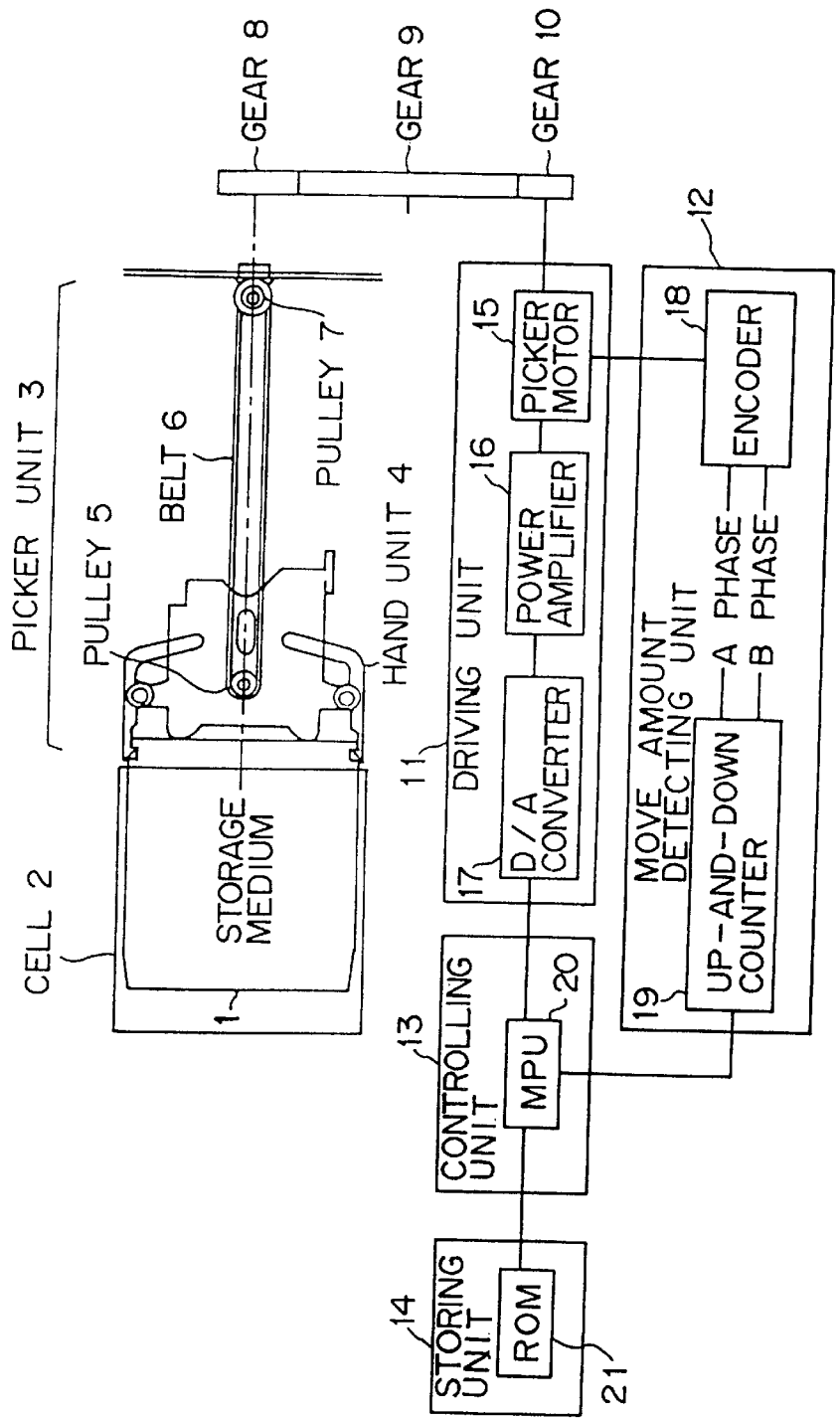
FIG. 1A is a schematic diagram showing a picker unit 3 and its associated components.
Figure 1B:
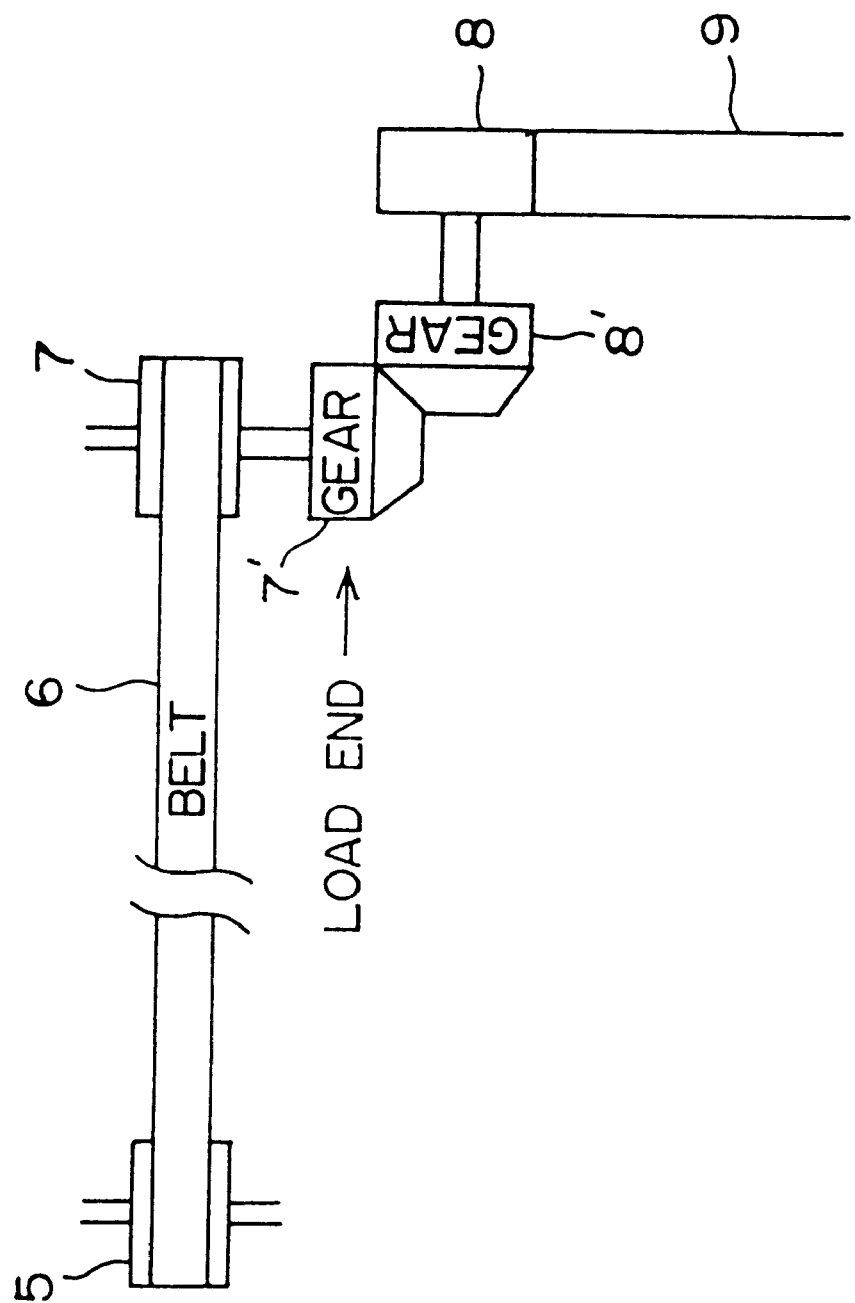
FIG. 1B is a schematic diagram showing a load end.

Provided below is the explanation about the details of the preferred embodiment according to the present invention, by referring to the drawings.

FIG. 2A is a block diagram showing the principle of a position controlling device according to the present invention. The position controlling device shown in FIG. 2A stores a plurality of storage media 1, and is used in a library device comprising an automatic transporting unit 51 which transports a storage medium 1. It comprises a driving unit 52, move amount detecting unit 53, storing unit 54, controlling unit 55, and a position detecting unit 56.

The operations of the position controlling device according to the first principle of the present invention are described below.

The driving unit 52 drives the automatic transporting unit 51.

The move amount detecting unit 53 is attached to the driving unit 52, and is intended to detect the amount of a move of the automatic transporting unit 51.

The storing unit 54 stores predetermined first distance data.

The controlling unit 55 corrects position data of the automatic transporting unit 51 using the ratio of second distance data obtained from the move amount detecting unit 53 to the first distance data, and controls the driving unit 52 using the corrected position data.

The automatic transporting unit 51 corresponds to, for example, an accessor including a hand unit, picker unit, and a Y unit. It transports a storage medium 1 to a specified position while gripping the storage medium 1. According to the first principle, the driving unit 52 drives the picker unit to move the hand unit backward and forward. The move amount detecting unit 53 detects the amount of a move of the hand unit according to the operations of the driving unit 52.

The storing unit 54 stores the first distance data such as the length of an entire stroke of the hand unit, which is determined at the time of the design. The controlling unit 55 calculates the ratio of the second distance data, which is output from the move amount detecting unit 53 when the hand unit moves to a position corresponding to the first distance data, to the first distance data.

The second distance data is an actually measured value corresponding to the first distance data, and the obtained ratio indicates the error of the amount of a move of the hand unit. The controlling unit 55 multiplies the position data indicating the distance from the home position to another position of the hand unit by the ratio, and thereby corrects the position data.

Figure 1C:
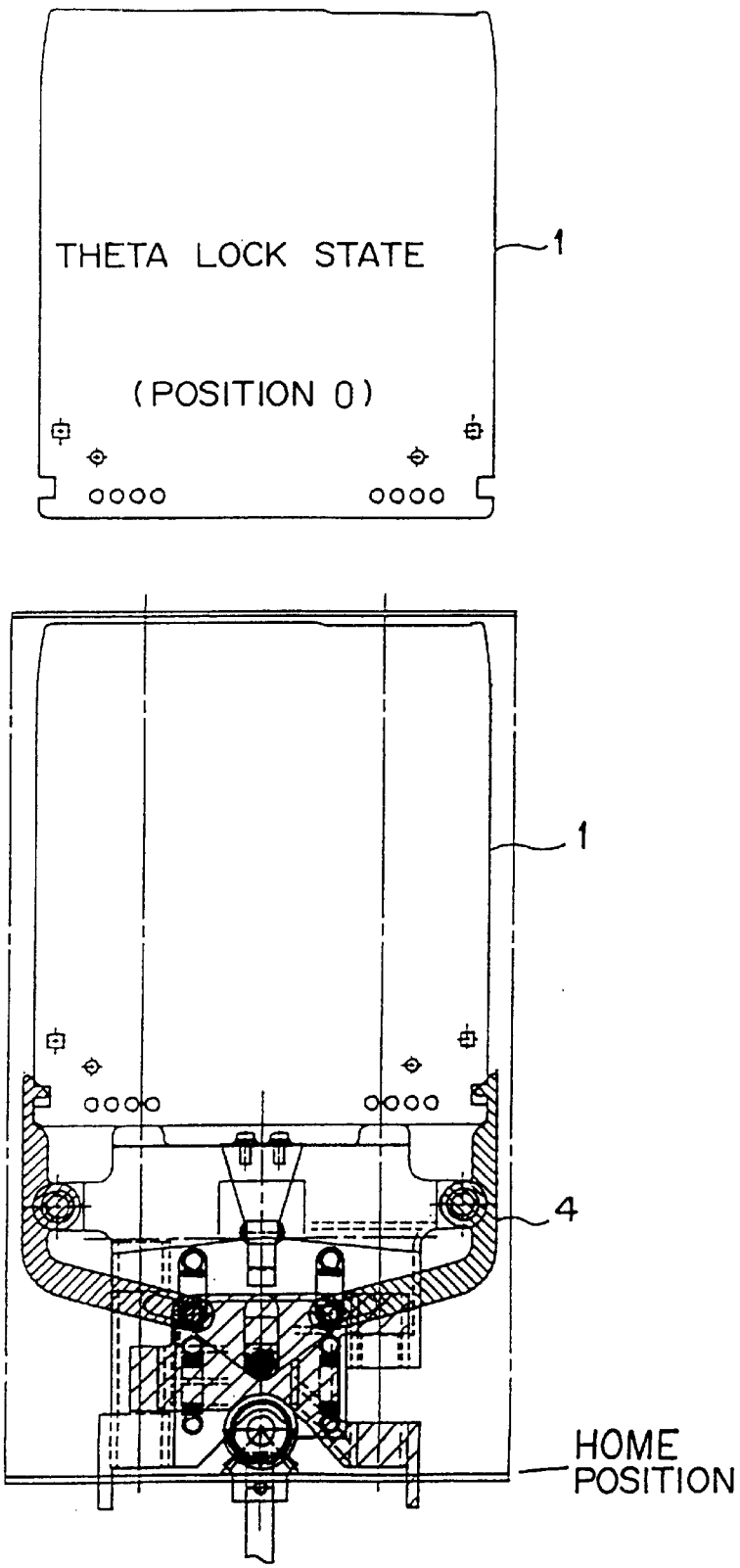
FIG. 1C shows a home position of a hand unit.
Figure 1D:
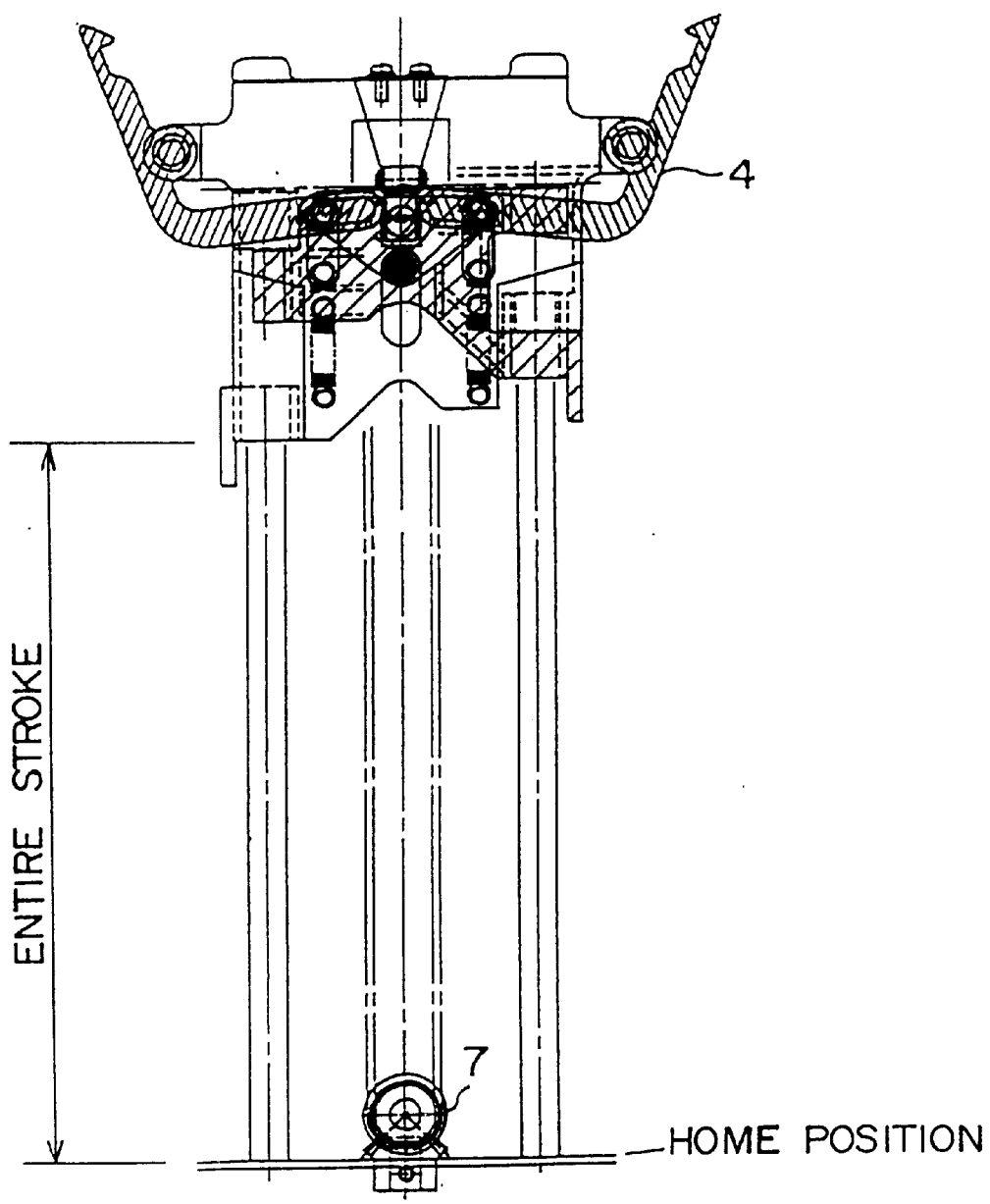
FIG. 1D shows an entire stroke.
Figure 1E:
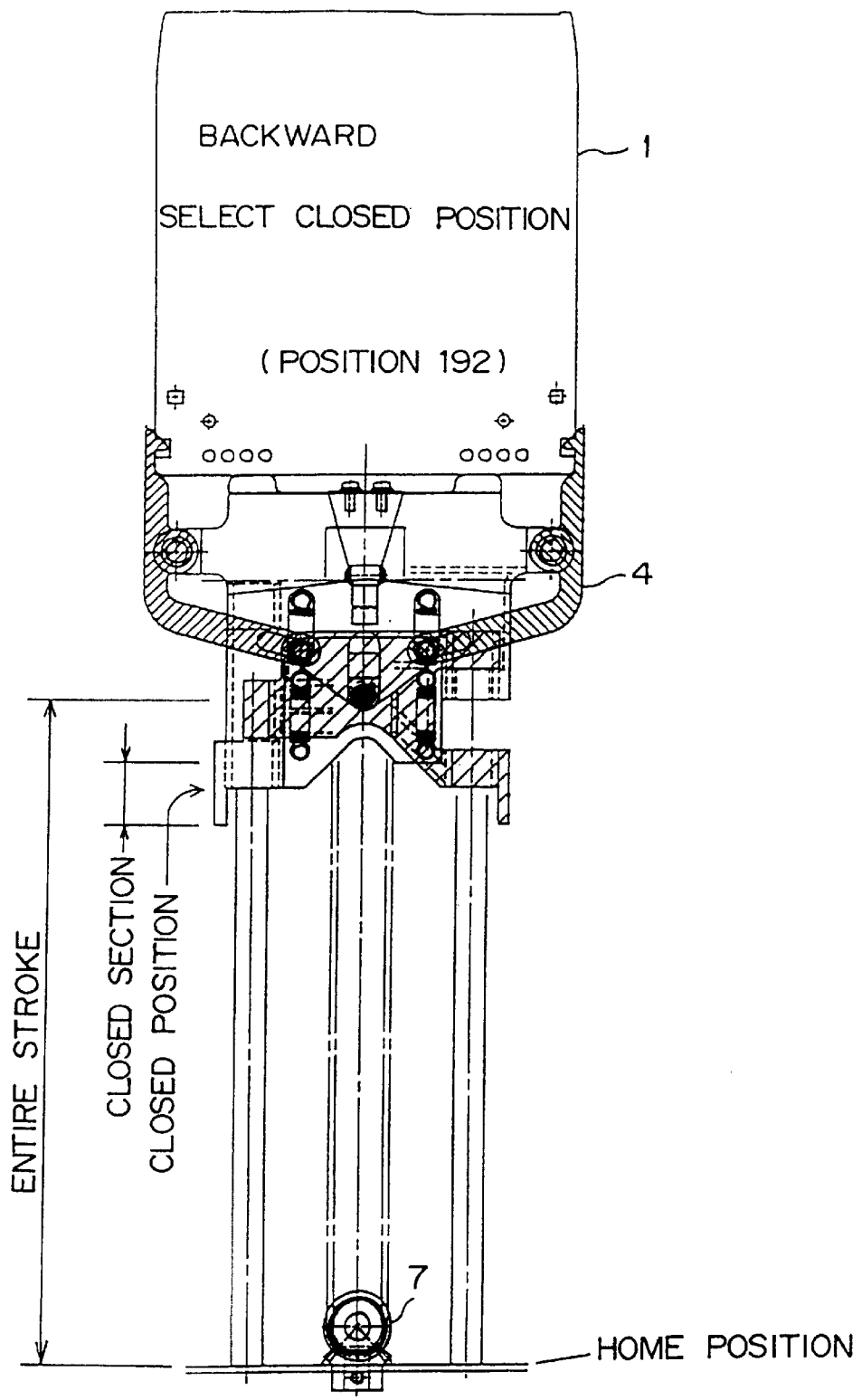
FIG. 1E shows a closed section.

For example, the design value of the distance from the home position to the closed position shown in FIG. 1E is multiplied by the ratio of an actually measured value of the entire stroke to its design value, so that the distance can be made closer to an actual value. A similar operation can be applied to the distance from the home position to the open position shown in FIG. 1F. If the driving unit 52 is controlled using corrected position data, an error is made smaller. As a result, the stop accuracy of the hand unit can be improved.

The operations of the position controlling device according to the second principle of the present invention are described below.

The driving unit 52 drives the automatic transporting unit 51.

The move amount detecting unit 53 is attached to the driving unit 52, and is intended to detect the amount of a move of the automatic transporting unit 51.

The position detecting unit 56 detects a particular position of the automatic transporting unit 51.

The controlling unit 55 moves the automatic transporting unit 51 in two or more directions, generates position data for control using two or more position data which are respectively obtained from the move amount detecting unit 53 when the particular position is detected in two or more directions, and controls the driving unit 52 using the position data for control.

According to the second principle, the driving unit 52 drives the Y unit to move the picker unit upward and downward. The move amount detecting unit 53 detects the amount of a move of the picker unit according to the operations of the driving unit 52. The position detecting unit 56 monitors the position of the picker unit, and detects a particular position such as the home position, stop position, etc.

The controlling unit 55 controls the driving unit 52 to move the picker unit upward. When the position detecting unit 56 detects the particular position, it stores the position data output from the move amount detecting unit 53 at that time. Then, the controlling unit 55 moves the picker unit downward. When the position detecting unit 56 detects the particular position, it stores the position data output from the move amount detecting unit 53 at that time.

The controlling unit 55 obtains an average value of these two position data obtained by the scanning in both of the directions, and recognizes the average value as the position data for control. With this process, a hysteresial error resultant from a backlash is cancelled, thereby obtaining correct position data for control. If the driving unit 52 is controlled using the position data for control, the stop position accuracy of the picker unit is improved.

Specifically, if each stop position of the picker unit is detected by the scanning in both of the directions, and the average value is used as the position data for control, an error due to a static/dynamic backlash can be eliminated. Additionally, if the home position of the picker unit is detected by the scanning in both of the directions, and the position data at each stop position is corrected by using the average value as the reference, an error due to a long term change in static/dynamic backlash can be eliminated.

With the position controlling device according to the present invention as described above, an error at a load end and an error due to backlash are eliminated, thereby accurately controlling a stop position of a mechanism unit of an accessor in a library device.

For example, the automatic transporting unit 51 shown in FIG. 2A corresponds to an accessor 62 shown in FIG. 4, to be described later; the driving unit 52 corresponds to the driving unit 11 shown in FIG. 1A or the driving unit 40 shown in FIG. 1J; the move amount detecting unit 53 corresponds to the move amount detecting unit 12 shown in FIG. 1A or the move amount detecting unit 41 shown in FIG. 1J; the storing unit 54 corresponds to a ROM 77 or a RAM 78 shown in FIG. 6, to be described later; the controlling unit 55 corresponds to an MPU 76 shown in FIG. 6; and the position detecting unit 56 corresponds to the Y flag 38 and the Y sensor 39 shown in FIG. 1J.

In the picker unit 3 shown in FIG. 1A, an error when a rotary motion is converted into a linear motion is caused by accumulation of radial errors at a load end. Therefore, the ratio of an actually measured value of the distance from the home position to the closed position shown in FIG. 1E (closed stroke), to its design value will be the same as that of an actually measured value of the entire stroke of the hand unit 4 to its design value. That is, the following relationship can be found.

actually measured value of a closed stroke=(actually measured value of the entire stroke/design value of the entire stroke)× design value of the closed stroke (1)

Figure 1F:
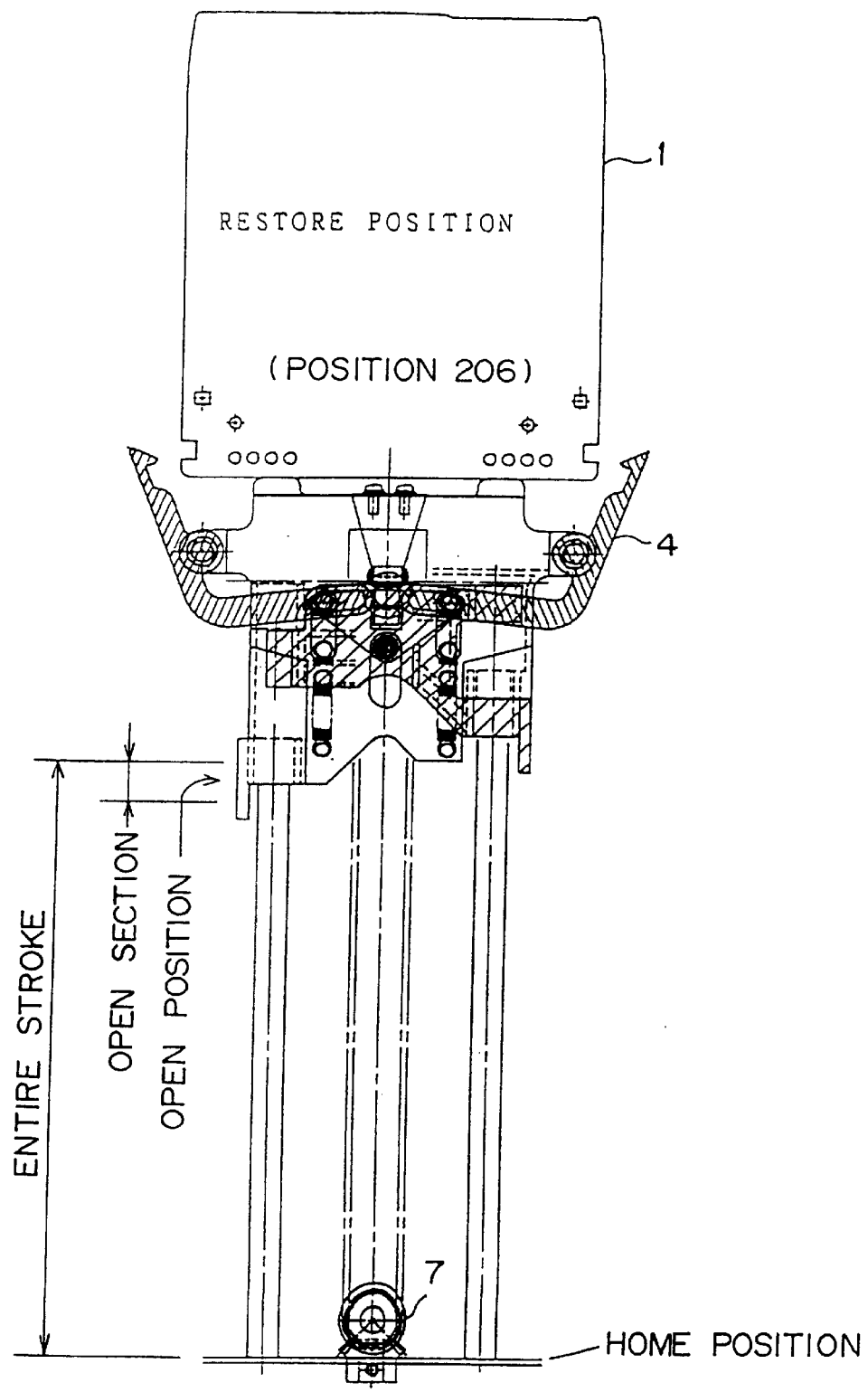
FIG. 1F shows an open section.
Figure 1G:
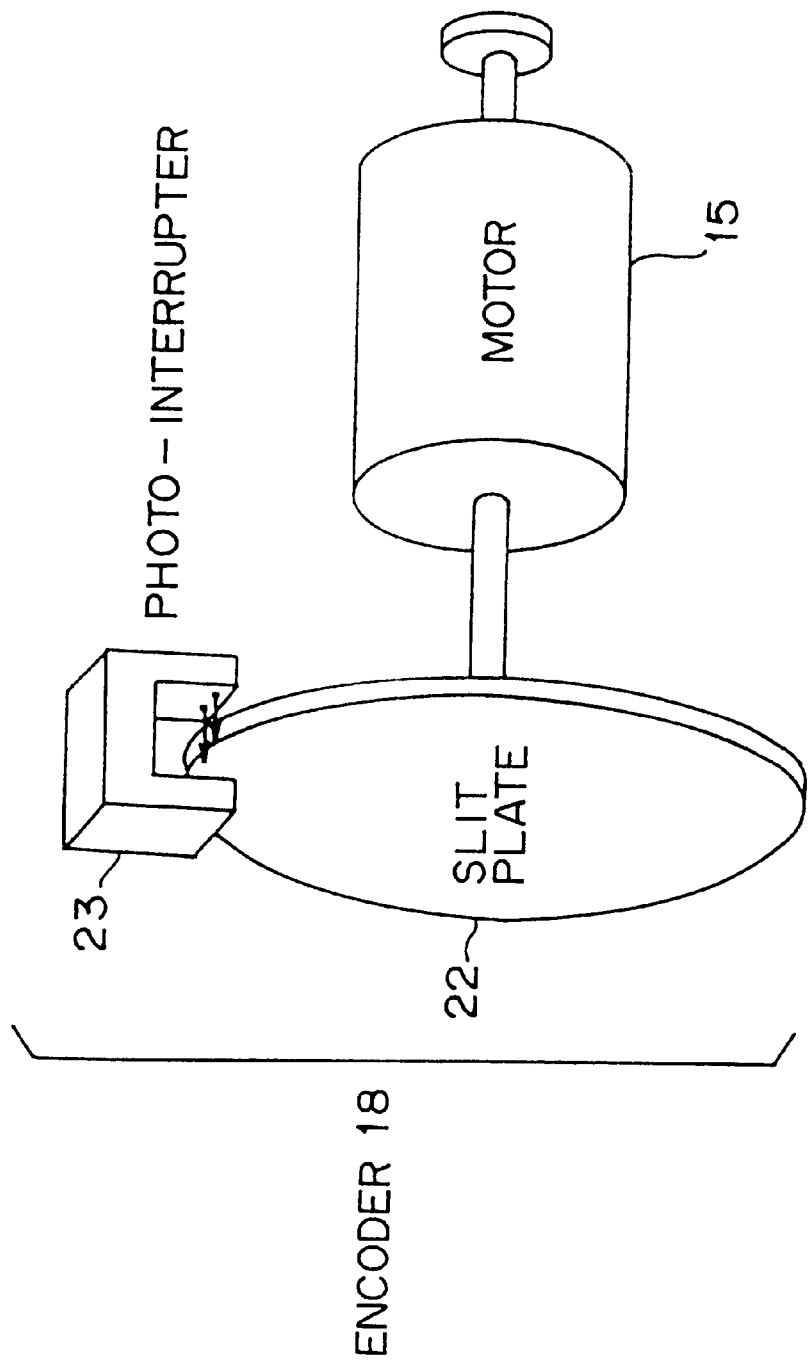
FIG. 1G shows an encoder.
Figure 1H:
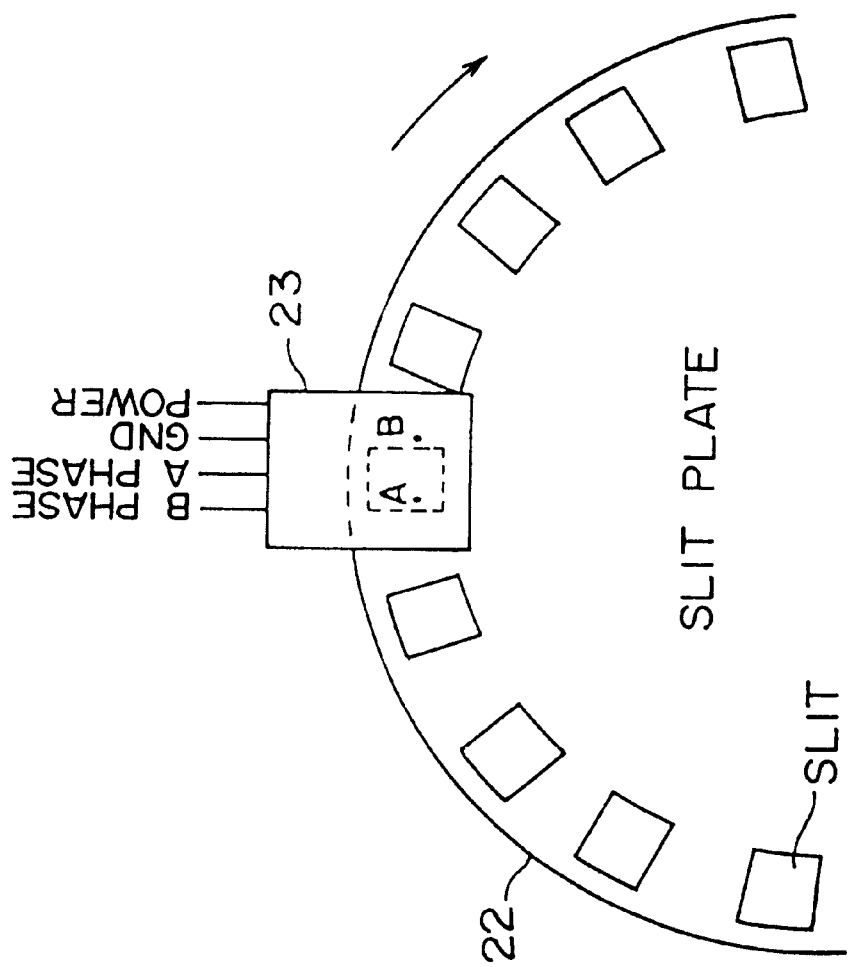
FIG. 1H shows a slit plate.

Furthermore, the following relationship can be found for the distance from the home position to the open position shown in FIG. 1F (open stroke) in a similar manner.

actually measured value of an open stroke=(actually measured value of the entire stroke/design value of the entire stroke)× design value of the open stroke (2)

Since each of the design values of the entire stroke, closed stroke, and the open stroke is known beforehand, an actually measured value of the distance between the home position and the closed position, and an actually measured value of the distance between the home position and the open position can be estimated using the above described equations (1) and (2), by obtaining only an actually measured value of the entire stroke. These estimation values are employed as the stop positions of the hand unit 4, thereby eliminating an error.

According to the present invention, an actually measured value is estimated from a design value of a counter value at a position by using the ratio of an actually measured value of an entire stroke and its design value, and the estimation value is used as the counter value at that position.

Figure 1J:
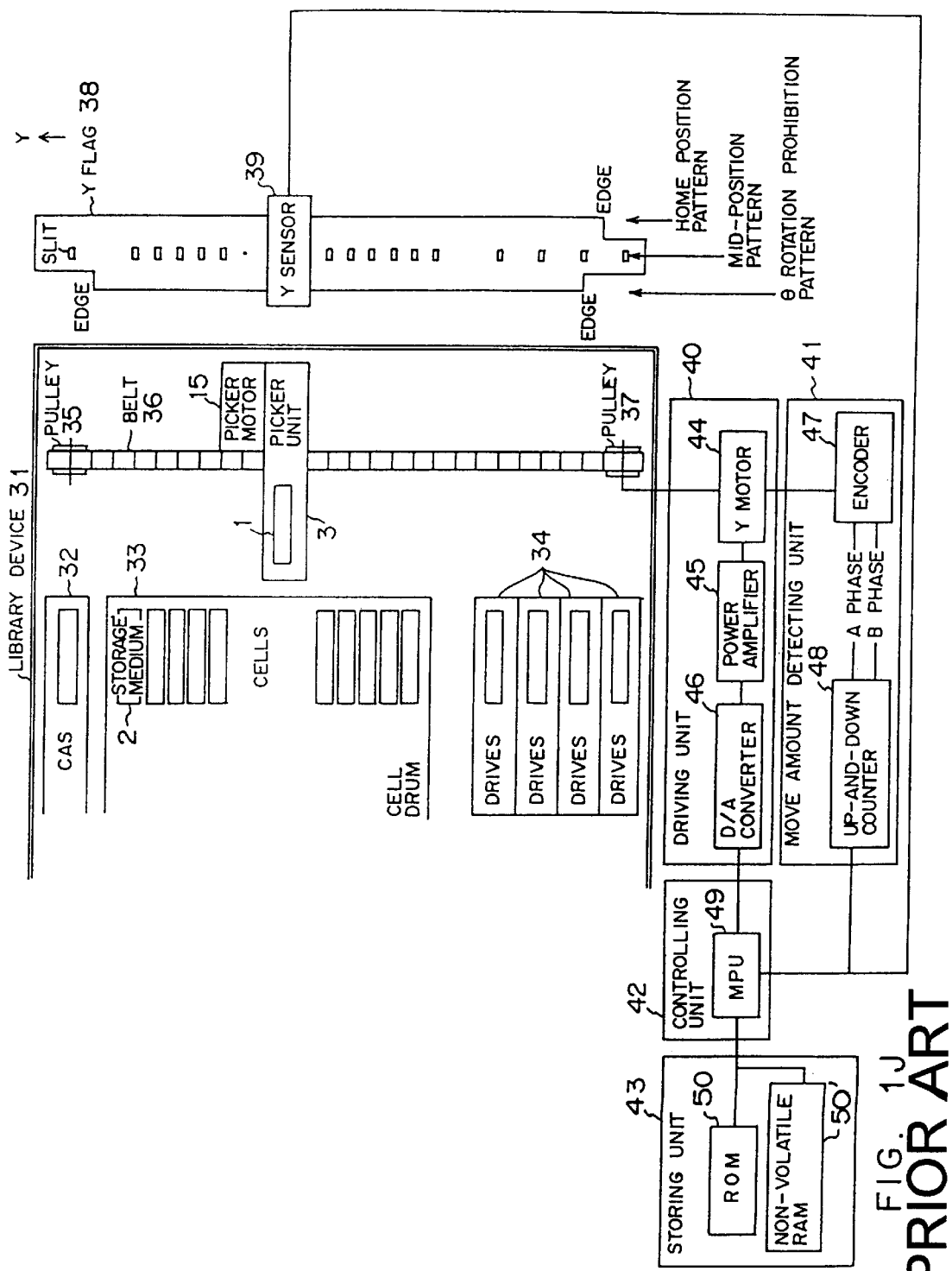
FIG. 1J is a schematic diagram showing a Y unit and its associated components.
Figure 1K:
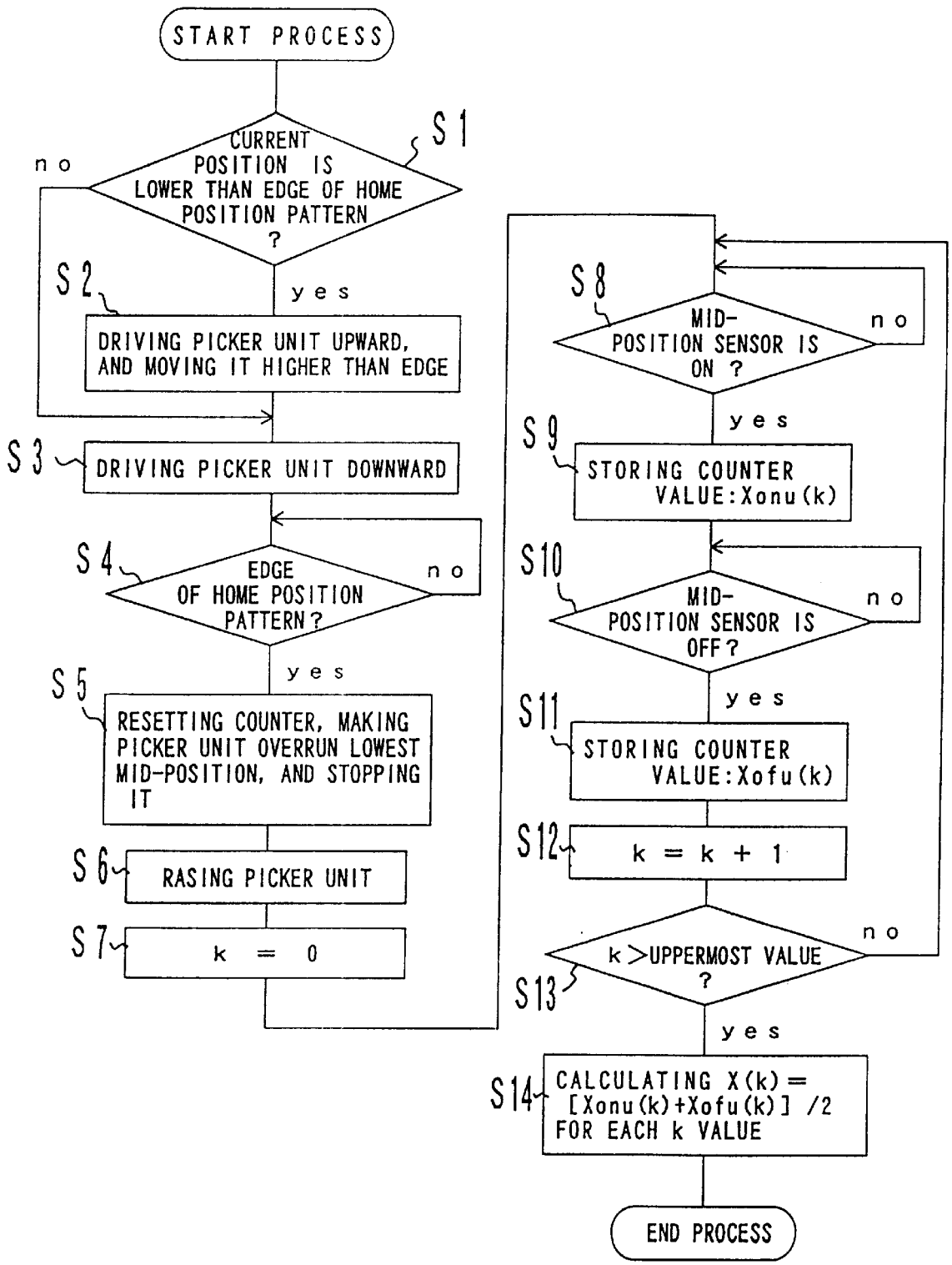
FIG. 1K is a flowchart showing a conventional position determination process.
Figure 1L:
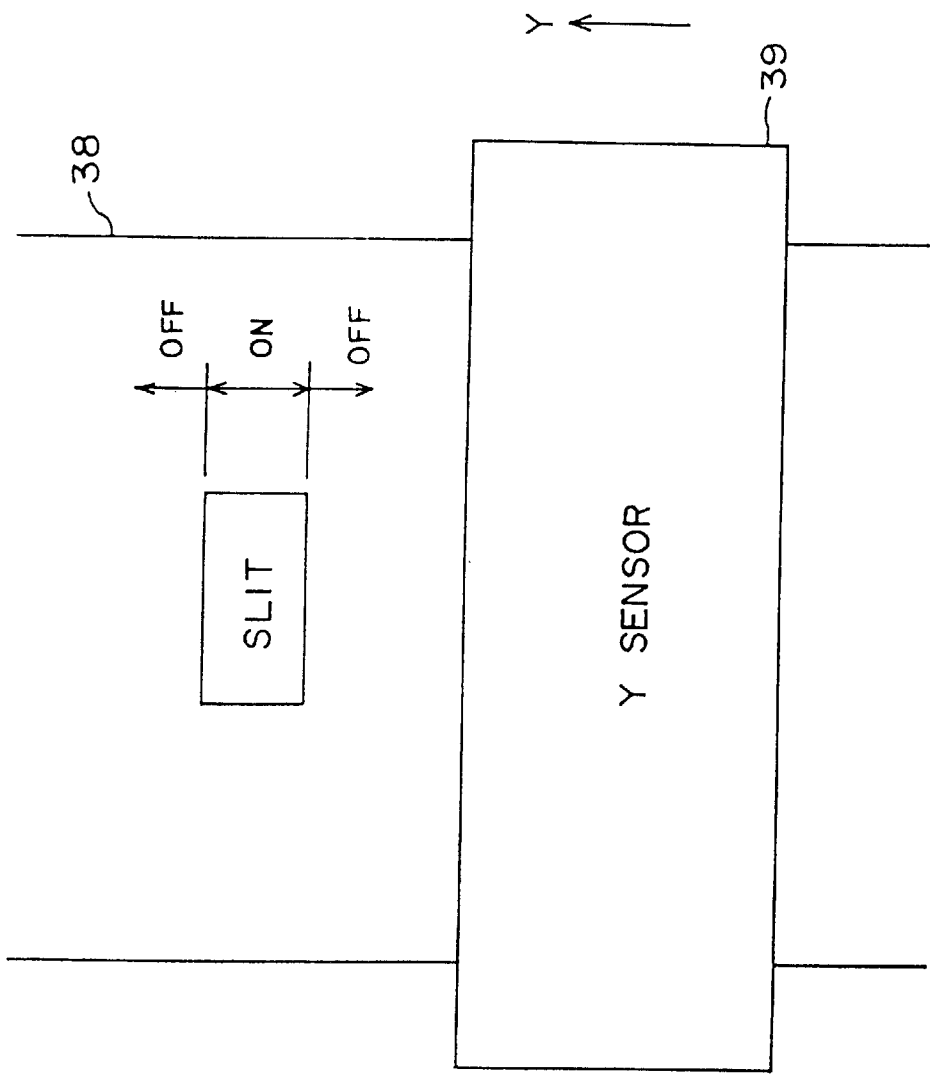
FIG. 1L shows ON/OFF of a mid-position sensor.

Additionally, an error when a rotary motion is converted into a linear motion is caused by accumulation of radial errors of a load end also in the Y unit shown in FIG. 1J. Conventionally, a stop position is determined by scanning the mid-position pattern in the upward direction with the Y sensor 39, so that an error is eliminated. In the Y unit, however, the above described static/dynamic backlashes exist.

Figure 2B:
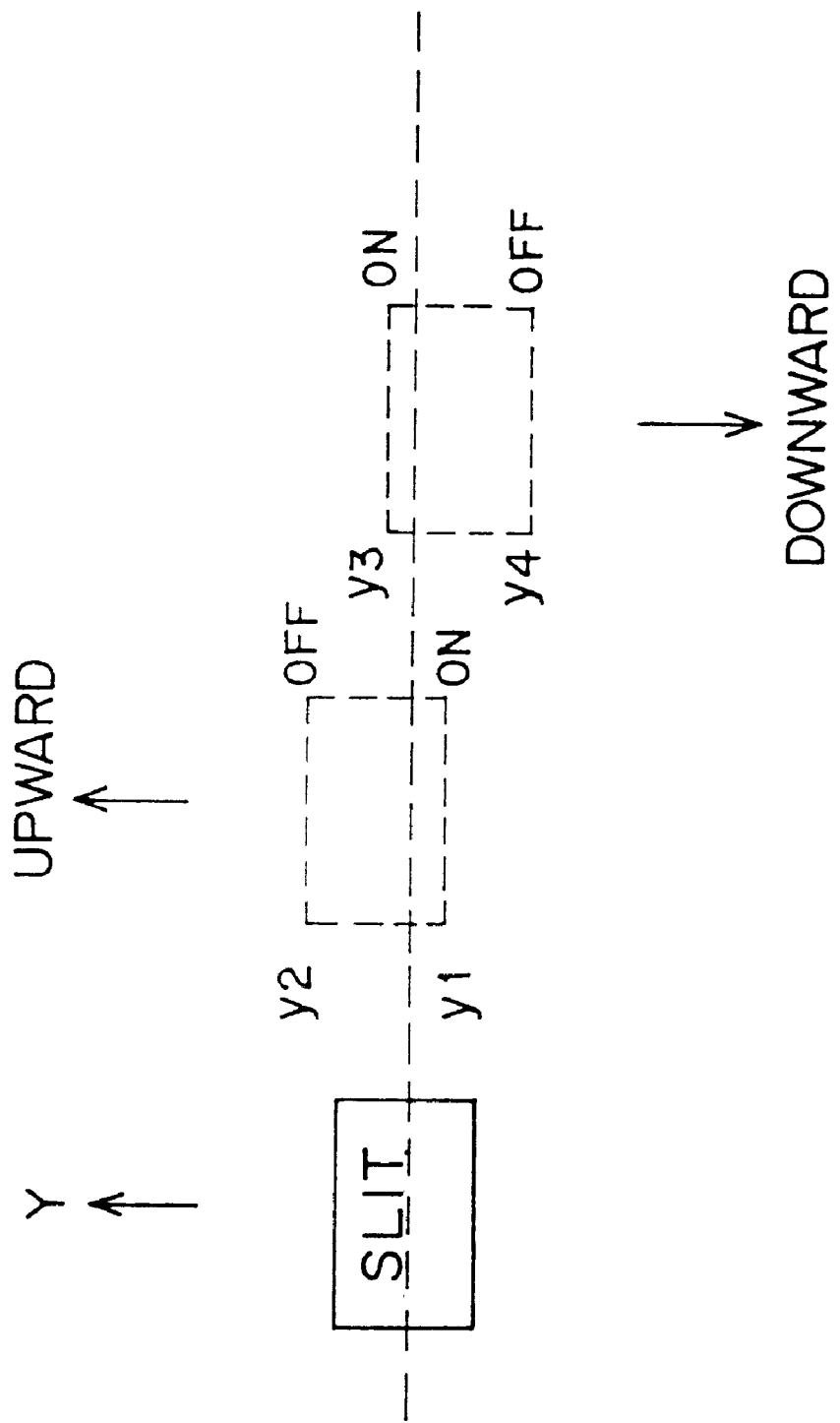
FIG. 2B is a schematic diagram showing an error due to backlash.

The static/dynamic backlashes normally have a hysteresial characteristic. The directions of occurrences of the static/dynamic backlashes may differ depending on whether the picker unit 3 is driven either upward or downward, as shown in FIG. 2B. Accordingly, a conventional determination in only one direction does not allow a motion in a different direction to be corrected properly.

However, the absolute values of an error of the hysteresial characteristic in the upward and downward directions are approximately the same. Accordingly, the error can be almost completely eliminated by performing scanning in both of the directions.

For example, the middle value of a slit from which static/dynamic backlashes are eliminated, can be obtained by calculating the average value (middle value) of a counter value at a position "y1" where a mid-position sensor is changed from OFF to ON when the picker unit 3 is driven upward, and a counter value at a position "y3" where the mid-position sensor is changed from OFF to ON when the picker unit 3 is driven downward. Additionally, a similar result can be obtained by calculating the middle value of a counter value at a position "y2" where a mid-position sensor is changed from ON to OFF when the picker unit 3 is driven upward, and a counter value at a position "y4" where the mid-position sensor is changed from OFF to ON when the picker unit 3 is driven downward.

According to the present invention, each mid-position pattern is scanned and determined in both of the upward and downward directions, and its middle value is determined based on the position information of a slit in the two directions. Additionally, also the home position of the home position pattern is determined by performing scanning in the upward and downward directions.

Provided next is the explanation about the structure of an optical disk library device according to an embodiment, by referring to FIGS. 3 through 6. The hardware structure of this library device is basically the same as that of the conventional library device 31 shown in FIGS. 1A and 1J. The same components as those shown in FIGS. 1A and 1J are denoted by the same reference numerals. The major differences between these library devices them are the contents of a program of the stop position determination process, and data used for that process.

Figure 3:
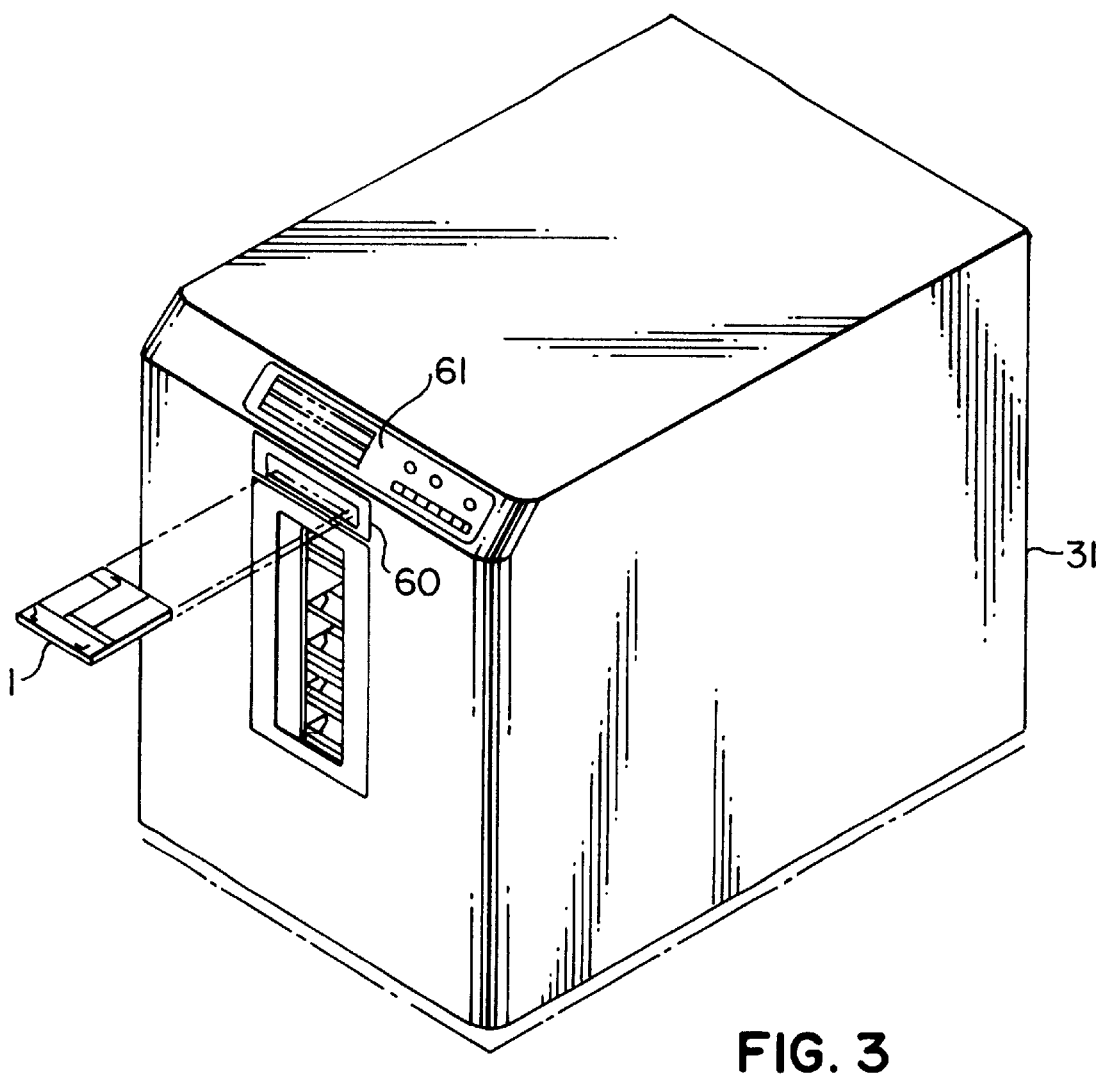
FIG. 3 shows the exterior view of a library device.

FIG. 3 shows the exterior view of the library device 31. In this figure, a loading/unloading aperture 60 for a storage medium 1, and an operation panel 61 operated by an operator are arranged on the front of the library device 31. FIG. 4 shows the simplified interior view of the library device 31.

Figure 4:
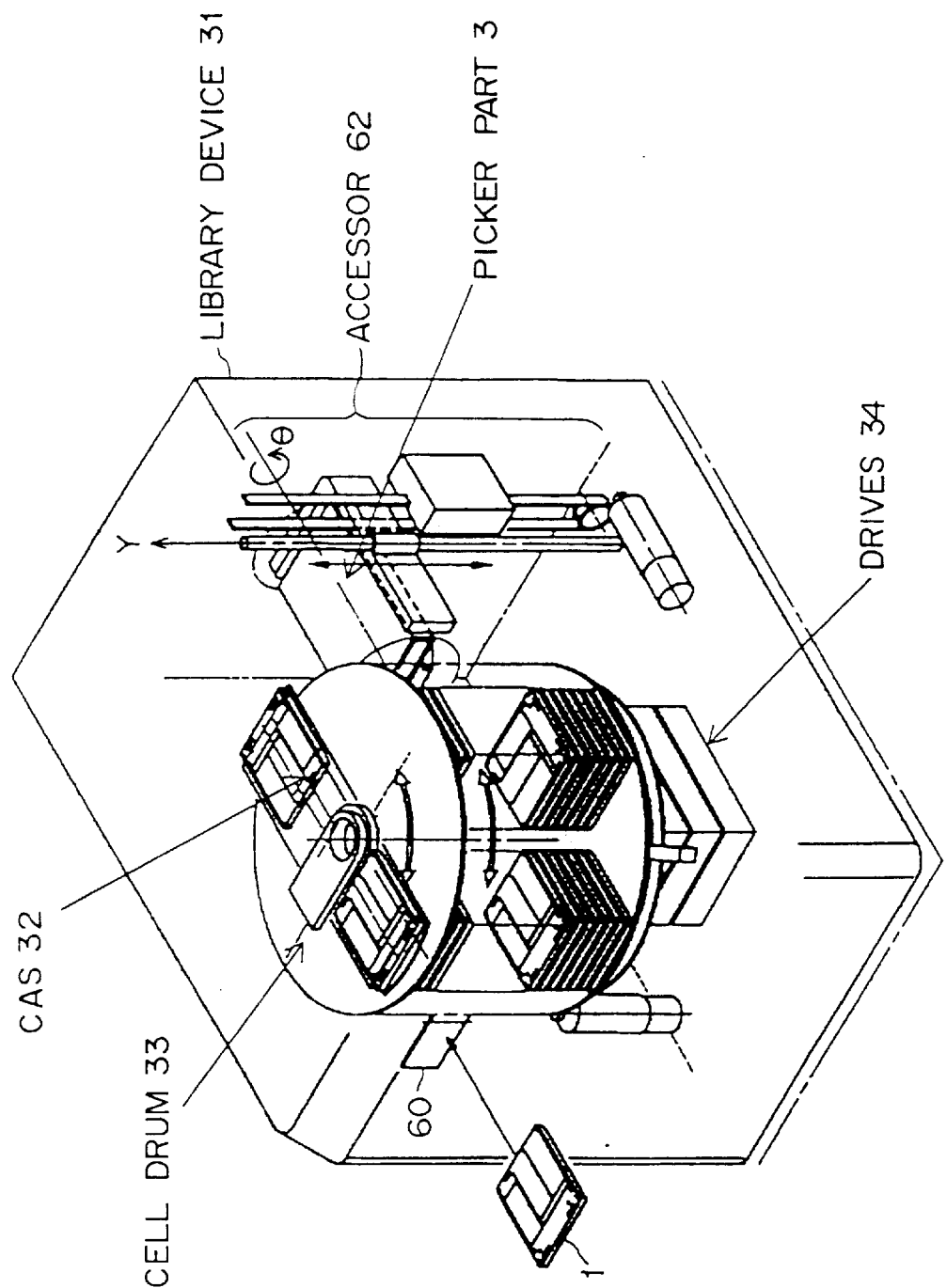
FIG. 4 shows the outlined interior view of the library device.

In FIG. 4, a storage medium 1 loaded from the loading/unloading aperture 60 to the CAS 32 is transported by an accessor 62, and inserted into the cell drum 33 or a drive 34. The picker unit 3 included in the accessor 62 moves in the direction of the Y axis, and can rotate about an axis perpendicular to the Y axis in a direction e under a predetermined condition.

Figure 5:
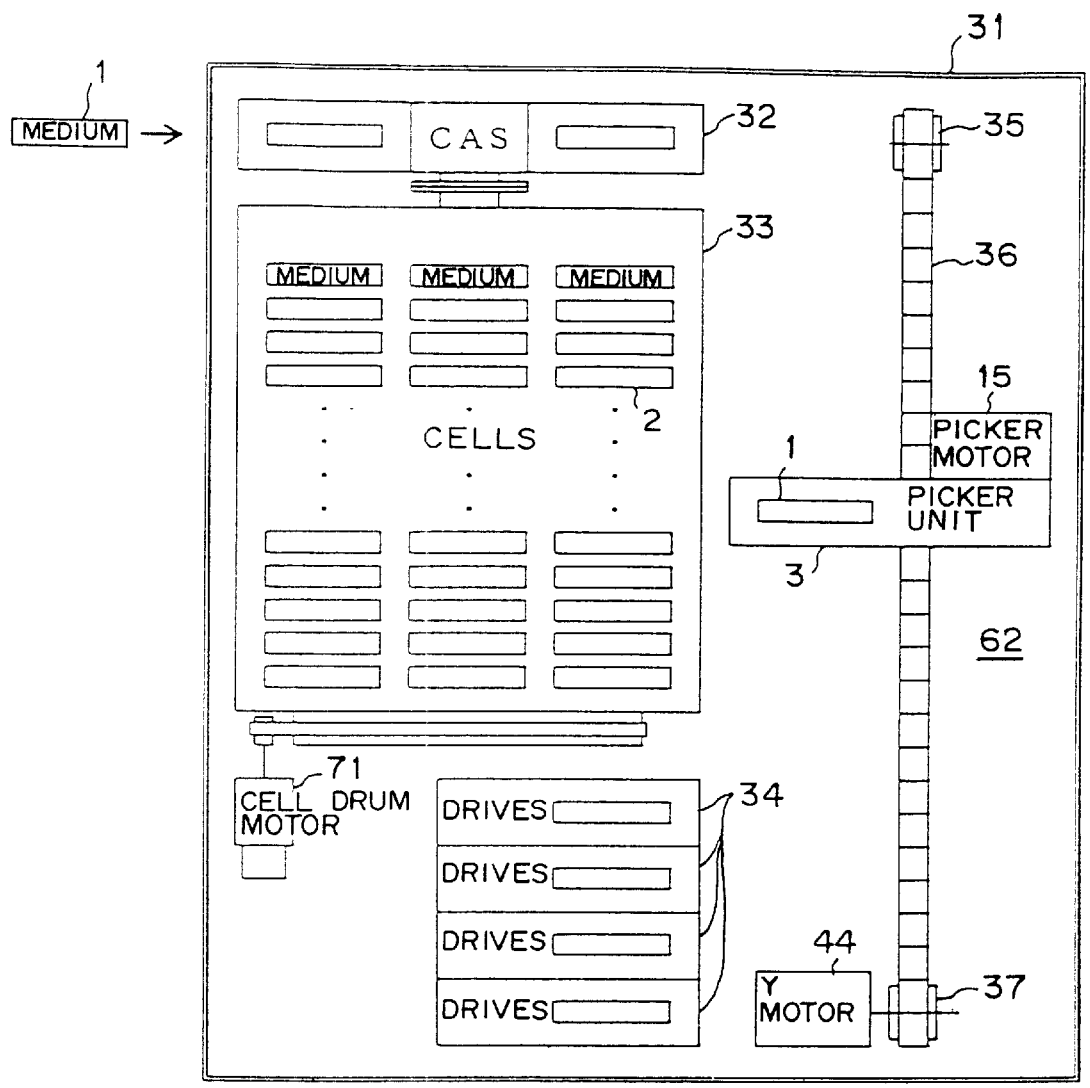
FIG. 5 is a schematic diagram showing the structure of the library device.

FIG. 5 shows the structure of the library device 31. In this figure, a cell drum motor 71 is a motor for rotating the cell drum 33. The Y sensor 39 shown in FIG. 1J is attached to the picker unit 3 shown in FIG. 5. The Y sensor 39 scans each of the patterns of the Y flag 38. The respective capabilities of the components shown in FIG. 5 are similar to those of the conventional components.

FIG. 6 is a block diagram showing the structure of a control/driving system for the accessor 62 and the cell drum 33. In this figure, the driving system of the picker unit 3 and the Y unit, which are included in the accessor 62, is similar to that described above. The driving system of the cell drum 33 includes a motor 71, power amplifier 72, D/A converter 73, two-phase (A- and B-phase) encoder 74, and an up-and-down counter circuit 75. The operations of the driving system of the cell drum 33 are similar to those of the driving system for the picker unit 3 and the Y unit.

An MPU 76 performs feedback control of these driving systems while using a non-volatile RAM 78 according to a program stored in a ROM 77. With the feedback control, the counter value at a stop position is estimated using an actually measured value of the entire stroke when the stop position of the hand unit 4 is determined according to the value of the up-and-down counter 19. Furthermore, the position information when the picker unit 3 is driven upward or downward is used when the stop position of the picker unit 3 is determined according to the value of the Y-axis up-and-down counter 48.

Figure 8:
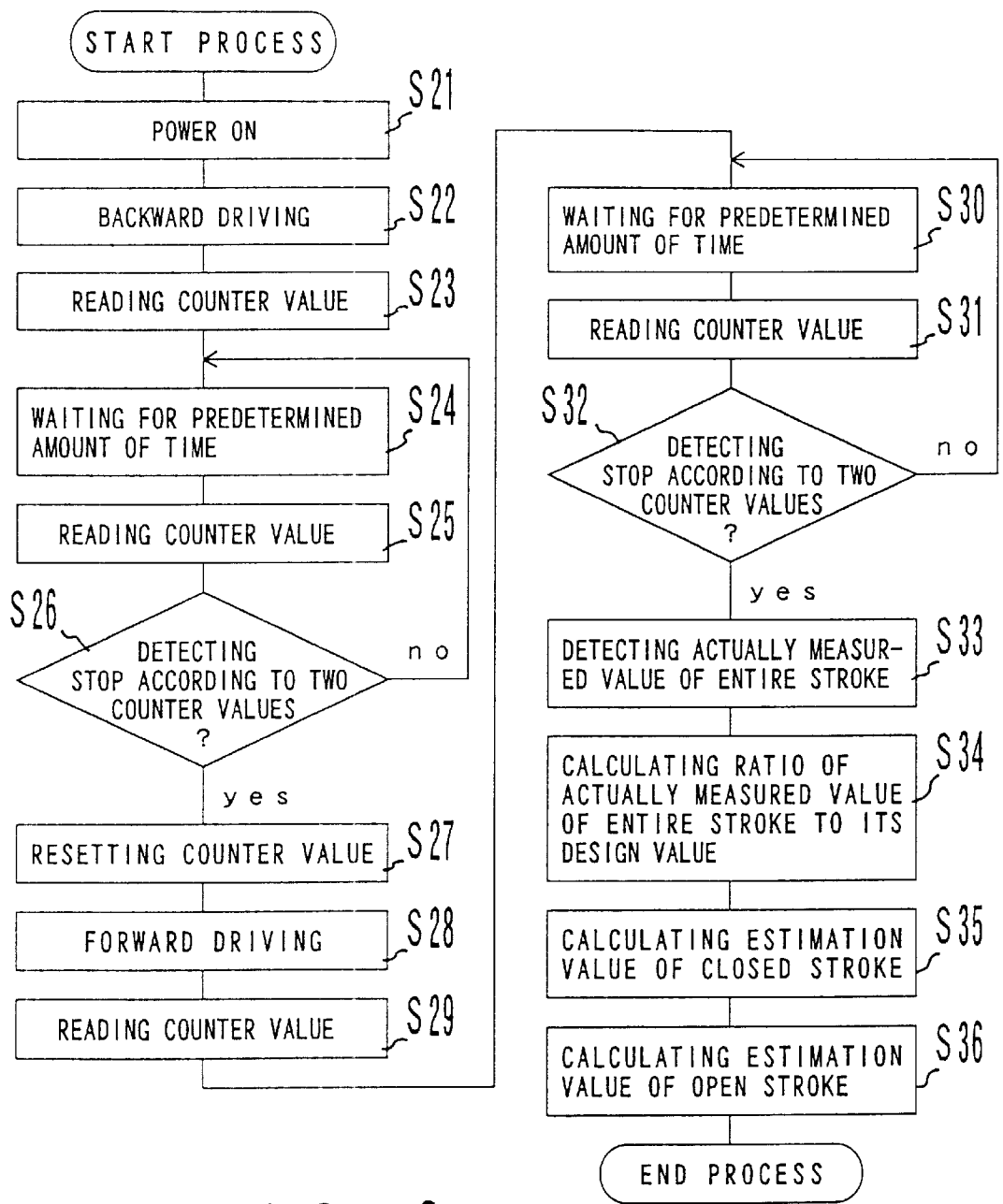
FIG. 8 is a flowchart showing a first process for calculating an estimation value.
Figure 9:
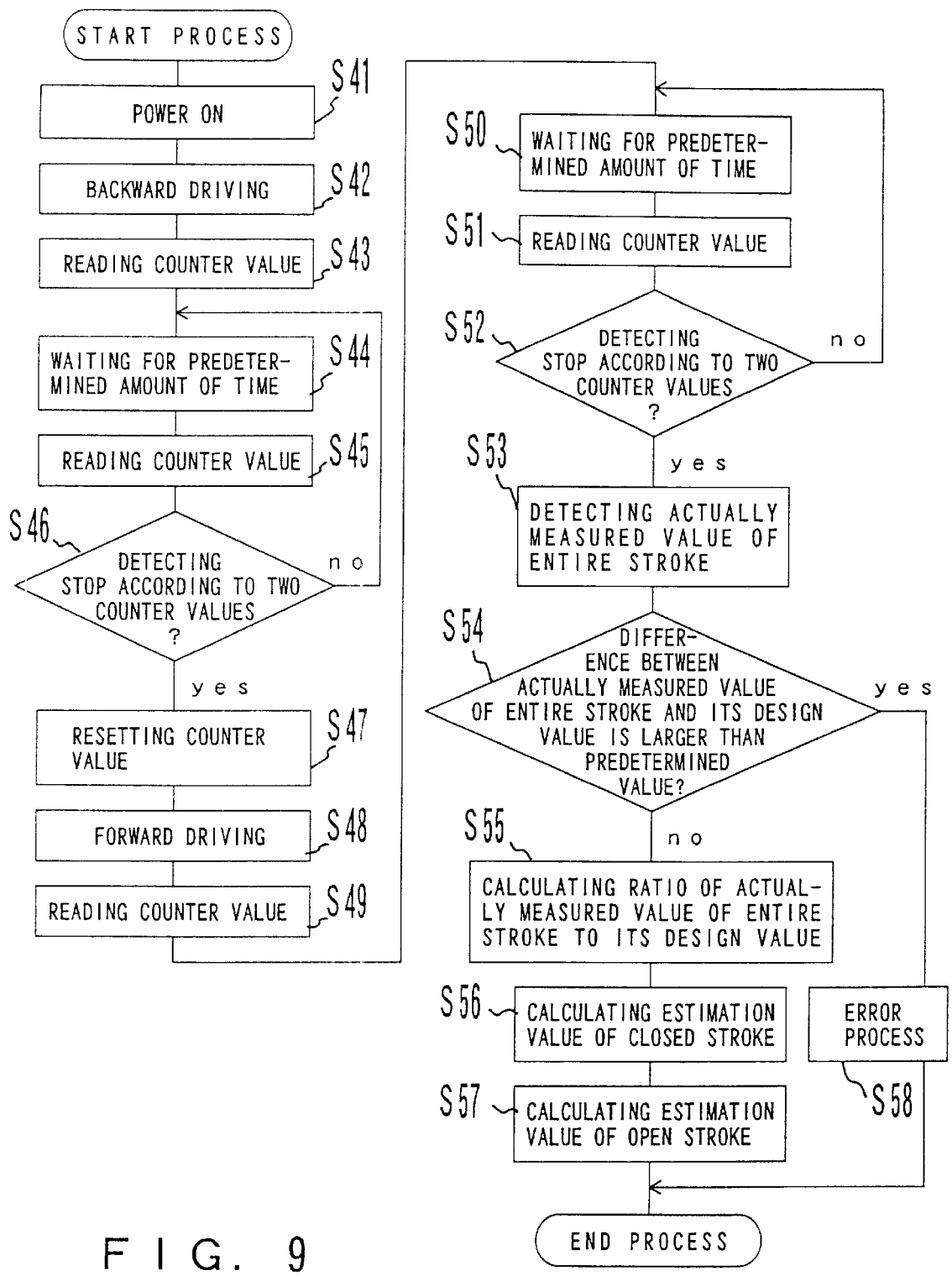
FIG. 9 is a flowchart showing a second process for calculating an estimation value.
Figure 11:
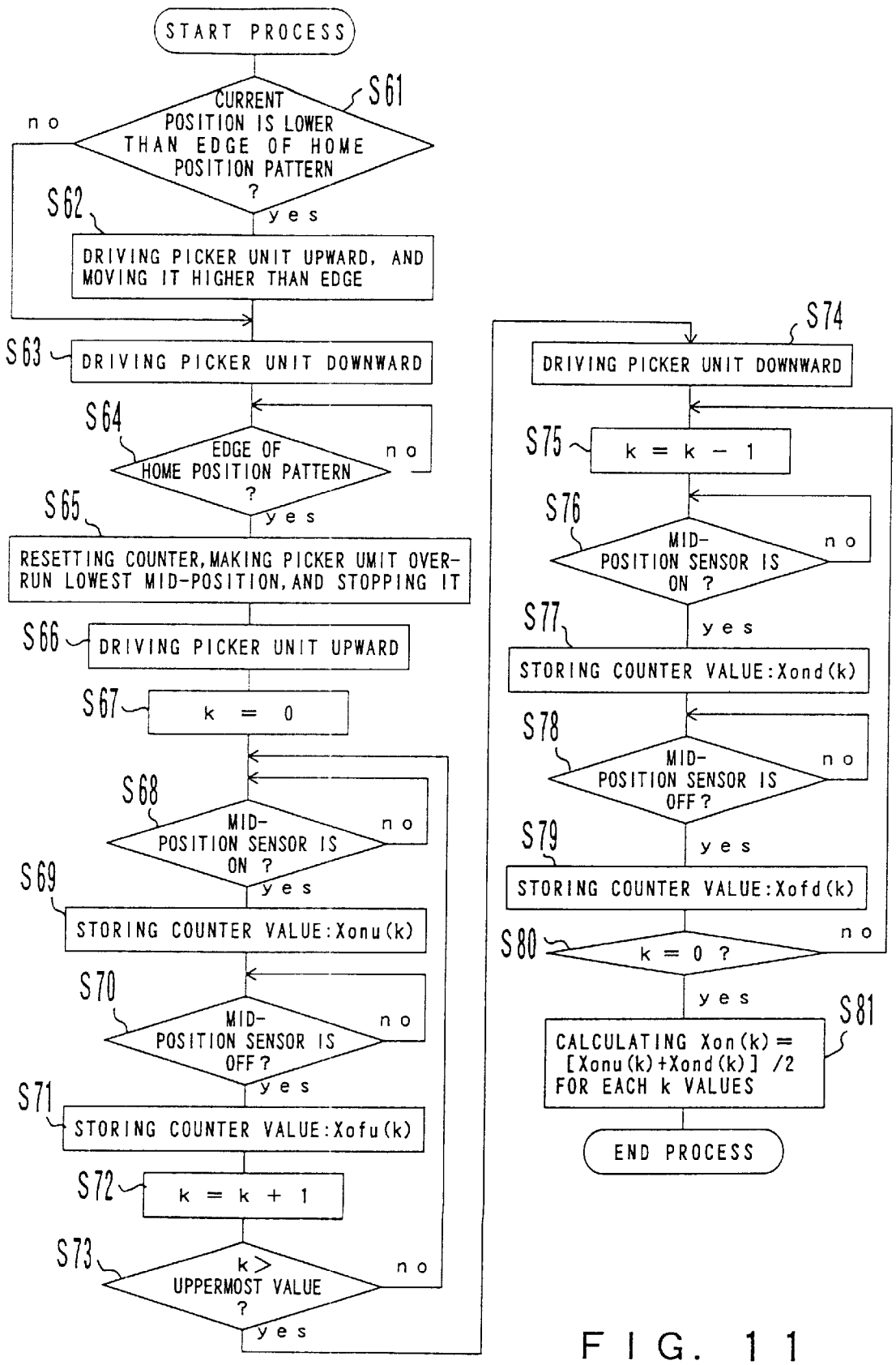

Provided next is the explanation about a process for estimating a stop position of the hand unit 4, by referring to FIGS. 7 through 9.

FIG. 7 shows a first table stored in the RAM 78. In this figure, the "BACK END" corresponds to the home position shown in FIG. 1C, while the "FRONT END" corresponds to the front end position of the entire stroke shown in FIG. 1D. The "CLOSED" and "OPEN" respectively correspond to the closed position shown in FIG. 1E and the open position shown in FIG. 1F. Design values "Xps1", "Xps2", "Xps3", and "Xps4" are respective theoretical values of counter values at predetermined positions. In the following embodiment, "Xps1" is set to "0", and "Xps2", "Xps3", "Xps4" correspond to the respective design values of the closed stroke, open stroke, and the entire stroke.

Actually measured values "Xpm1" and "Xpm4" are actually measured counter values at the home position and the front end position, respectively. According to the following embodiment, a counter value is reset at the home position. Therefore, "Xpm1" is set to "0", and "Xpm4" corresponds to an actually measured value of the entire stroke. Estimation values "Xpc2" and "Xpc3" are respectively calculated values of the counter values at the open and closed positions.

To obtain the actually measured value of the entire stroke, the up-and-down counter 19 is first reset at the home position, and the hand unit 4 is driven slowly in a forward direction so as not to apply a load to the picker unit 3. After it is verified that a counter value remains unchanged for a predetermined amount of time, that value is recognized as the actually measured value of the entire stroke.

FIG. 8 is a flowchart showing the first process for calculating an estimation value using an actually measured value of the entire stroke. When power is turned on (step S21), the MPU 76 reads a counter value (step S23) while driving the hand unit 4 in a backward direction (step S22). After the MPU 76 waits for a predetermined amount of time (step S24), it again reads the counter value (step S25).

Next, the MPU 76 determines whether or not the hand unit 4 stops by making a comparison between the two successively read counter values (step S26). If these values are different, the MPU 76 determines that the hand unit 4 is still moving, and repeats the process in and after step S24. When the values are the same, the MPU 76 determines that the hand unit 4 has stopped, and resets the counter value to "0" (step S27). At this time, "Xpm1=0" is set in the table shown in FIG. 7.

Then, the MPU 76 reads the counter value (step S29) while driving the hand unit 4 in a forward direction (step S28). After the MPU 76 waits for a predetermined amount of time (step S30), it again reads the counter value (step S31).

The MPU 76 determines whether or not the hand unit 4 has stopped by making a comparison between the two successively read counter values (step S32). If these values are different, the MPU 76 determines that the hand unit 4 is still moving, and repeats the process in and after step S30. When the value are the same, the MPU 76 determines that the hand unit 4 has stopped, and recognizes the counter value as the actually measured value of the entire stroke "Xpm4", and registers it to the table shown in FIG. 7 (step S33).

Next, the MPU 76 calculates a ratio "Xpm4/Xps4", from the actually measured value of the entire stroke "Xpm4" and its design value "Xps4" (step S34). The MPU 76 then calculates the estimation value "Xpc2" of the closed stroke using the equation (1) (step S35), calculates the estimation value "Xpc3" of the open stroke using the equation (2) (step S36), and terminates the process. The obtained estimation values "Xpc2" and "Xpc3" are registered to the table shown in FIG. 7 as the respective counter values at the closed and open positions, and are used to control the picker unit 3.

Assuming that the actually measured value "Xpm4=220" is obtained for the design value "Xps4=211", the estimation value "Xpc2" of the closed stroke corresponding to the design value "Xps2=192" will be 200.2. A similar result can be obtained also for the estimation value "Xpc3" of the open stroke.

The process for calculating an estimation value, which is shown in FIG. 8, is executed by measuring the entire stroke. If the hand unit 4 becomes jammed partway, or if the friction of the picker unit 3 is too high, the entire stroke may be erroneously measured.

To avoid this, a process for comparing the actually measured value "Xpm4" with the design value "Xps4", and recognizing the "Xpm4" as an error if it is smaller than the "Xps4" by a predetermined amount, may be added. With this process, an abnormal state of the hand unit 4 or the picker unit 3 can be detected using the design value, when the value of the entire stroke is actually measured.

FIG. 9 is a flowchart showing the second process for calculating an estimation value, which is intended for detecting an abnormal state.

When power is turned on (step S41), the MPU 76 reads a counter value (step S43) while driving the hand unit 4 in the backward direction (step S42). After the MPU 76 waits for a predetermined amount of time (step S44), it again reads the counter value (step S45).

Then, the MPU 76 makes a comparison between the two successively read counter values, and determines whether or not the hand unit 4 has stopped (step S46). If the hand unit 4 is still moving, the MPU 76 repeats the process in and after step S44. When the hand unit 4 has stopped, the MPU 76 resets the counter value to "0" (step S47). At this time, "Xpm1=0" is registered to the table shown in FIG. 7.

Next, the MPU 76 reads the counter value (step S49) while driving the hand unit 4 in the forward direction (step S48). After the MPU 76 waits for a predetermined amount of time (step S50), it again reads the counter value (step S51).

The MPU 76 then determines whether or not the hand unit 4 has stopped by making a comparison between the two successively read counter values (step S52). If the hand unit 4 is still moving, the MPU 76 repeats the process in and after step S50. When the hand unit 4 has stopped, the MPU 76 recognizes the counter value at that time as the actually measured value of the entire stroke "Xpm4", and registers it to the table shown in FIG. 7 (step S53).

Then, the MPU 76 determines whether or not the difference |Xpm4−Xps4| between the actually measured value of the entire stroke "Xpm4" and the design value "Xps" is larger than a predetermined value (step S54). If the difference is larger than the predetermined value, the MPU 76 recognizes that a fault has occurred, performs an error process (step S58), and terminates the process. With the error process, the MPU 76, for example, lights up an LED (Light Emitting Diode) indicating a fault on the operation panel 61, displays an error message on a display unit, etc.

If the difference |Xpm4−Xps4| is equal to or smaller than the predetermined value, the MPU 76 calculates the ratio of the actually measured value of the entire stroke "Xpm4" to its design value "Xps4" according to both of the values (step S55). The MPU 76 then calculates the estimation value "Xpc2" of the closed stroke using the equation (1) (step S56), calculates the estimation value "Xpc3" of the open stroke using the equation (2) (step S57), and terminates the process.

By including in a program such as the first or the second process for calculating an estimation value, an error when a rotary motion is converted into a linear motion, and an unevenness introduced when a mechanism is assembled, can be efficiently absorbed. As a result, the accuracy of a stop position can be improved. This controlling method is more accurate than the conventional controlling method using a fixed value such as a design value or an experimental value. Additionally, there is no need to newly arrange a sensor for detecting a position at each stop position, thereby reducing a hardware cost of a future library device.

Provided next is the explanation about a process for determining a stop position of the picker unit 3, by referring to FIGS. 10 through 15.

FIG. 10 shows the second table stored by the RAM 78. In this figure, drives D1 through D4 respectively correspond to the drives 34 shown in FIG. 5; cells C1 through C30 respectively indicate the stop positions of the cells 2 in the cell drum 33; and CAS indicates the stop position of the CAS 32.

"Xonu(k) (k=0, 1, . . . , 34)" is the counter value at the position where a mid-position sensor is changed to ON when the picker unit 3 is driven upward, while "Xofu(k)" is the counter value at the position where the mid-position sensor is changed to OFF when the picker unit 3 is driven upward. "Xond(k)" is the counter value at the position where the mid-position sensor is changed to ON when the picker unit 3 is driven downward, while "Xofd(k)" is the counter value at the position where the mid-position sensor is changed to OFF when the picker unit 3 is driven downward.

"Xon(k)" indicates the middle value between the "Xonu (k)" and "Xond(k)", while "Xof(k)" indicates the middle value between the "Xofu(k)" and "Xofd(k). "X(k)" indicates the middle value between the "Xon(k)" and "Xof(k)". In this table, the uppermost value of "k" corresponding to the uppermost stop position is "34".

Figure 11:
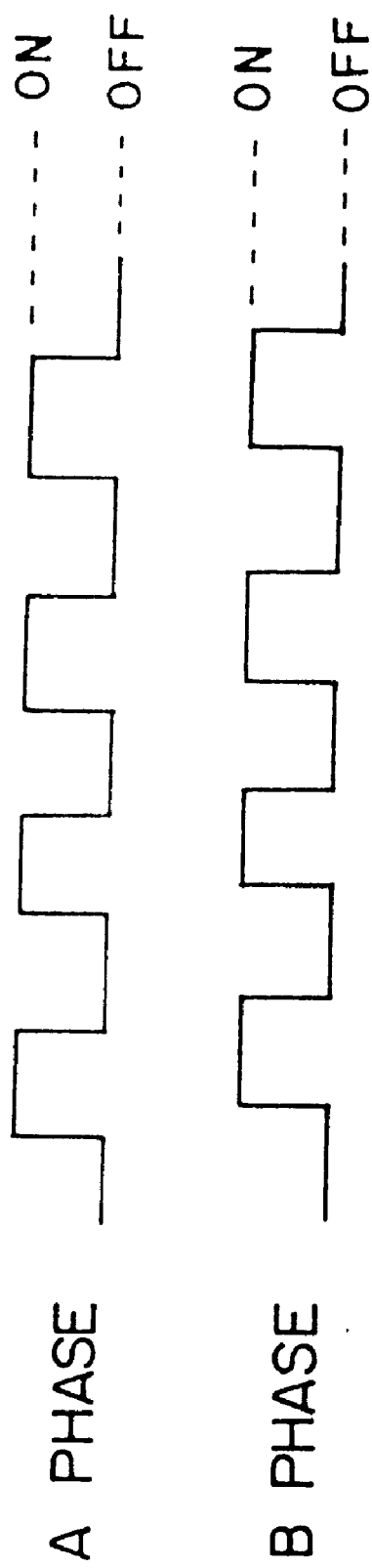
FIG. 11 is a flowchart showing a first process for determining a position.

FIG. 11 is a flowchart showing the first process for determining a position, which scans a mid-position pattern in both of the directions. Once the process is started, the MPU 76 determines whether or not the current position is lower than the edge of the home position pattern (step S61). If "YES", the MPU 76 drives the picker unit 3 upward, so that the picker unit 3 is higher than the edge (step S62).

Then, the MPU 76 drives the picker unit 3 downward (step S63), and determines whether or not the edge of the home position pattern is detected (step S64). If "YES", the MPU 76 resets the up-and-down counter 48, makes the picker unit 3 overrun the lowest mid-position, and stops it (step S65). With this process, the position of the edge of the home position pattern is made to correspond to the counter value "0".

Next, the MPU 76 drives the picker unit 3 upward (step S66), sets the control variable "k" to "0" (step S67), and determines whether or not the mid-position sensor is ON (step S68). When the mid-position sensor becomes ON, the MPU 76 recognizes the counter value at that time as "Xonu(k)", and registers it to the table shown in FIG. 10 (step S69). The MPU 76 then determines whether or not the mid-position sensor is OFF (step S70). When the mid-position sensor becomes OFF, the MPU 76 recognizes the counter value at the time as "Xofu(k)", and registers it to the table shown in FIG. 10 (step S71).

Then, the MPU 76 sets "k=k+1" (step S72), and determines whether or not the value of "k" exceeds "34" which corresponds to the uppermost position (step S73). If "NO", the MPU 76 repeats the process in and after S68.

If the value of "k" is larger than "34" in step S73, the MPU 76 drives the picker unit 3 downward (step S74), and sets "k=k−1" (step S75). The MPU 76 then determines whether or not the mid-position sensor is ON (step S76). If "YES", the MPU 76 recognizes the counter value at that time as "Xond(k)", and registers it to the table shown in FIG. 10 (step S77). Next, the MPU 76 determines whether or not the mid-position sensor is OFF. When the mid-position sensor becomes OFF, the MPU 76 recognizes the counter value at that time as "xofd(k)", and registers it to the table shown in FIG. 10 (step S79).

The MPU 76 then determines whether or not the value of "k" becomes "0" (step S80). If "NO", the MPU 76 repeats the process in and after step S75. If the value of "k" becomes "0", the MPU 76 calculates "Xon(k)=[Xonu(k)+Xond(k)]/2" for each of the values of "k" from 0 to 34, obtains the middle value "Xon(k)" (step S81), and terminates the process. The obtained middle value "Xon(k)" (k=0, 1, . . . , 34) is registered to the table shown in FIG. 10 as the counter value at each stop position, and is used for controlling the Y unit.

In step S81 of FIG. 11, the middle value "Xon(k)" is obtained as the corrected stop position. However, "Xof(k)=[Xofu(k)+Xofd(k)]/2 may be alternatively obtained and used as the counter value at each stop position.

Although the "Xon(k)" and "Xof(k)" are theoretically considered to be the same value, it is desirable that there are more sampled values. Accordingly, it is more effective to use their average value. Desirably, after the "Xon(k)" and "Xof (K)" are obtained, the middle value "X(k)=[Xon(k)+Xof (k)]/2 is calculated and used as the counter value at each stop position.

In steps S63 through S65 of FIG. 11, the position of the edge which is the home position of the home position pattern is determined with only the downward scanning. With such unidirectional scanning, if a static/dynamic backlash changes, a determined home position may be changed.

Although the directions of occurrences of an error due to the hysteresial characteristic of a static/dynamic backlash may differ depending on whether the picker unit 3 is driven either upward or downward, the absolute values are approximately the same. Therefore, it is possible to almost completely eliminate the error by performing scanning in both of the upward and downward directions.

Here, the middle value of each mid-position is corrected by using the middle value between the counter value at the position of the edge of the home position pattern, which is detected when the picker unit 3 is driven upward, and the counter value at the position of the edge, which is detected when the picker unit 3 is driven downward, as the counter value at the home position. With this process, even if a backlash varies, the relationship between the counter value at the home position and each middle value is maintained constantly.

FIG. 12 shows the third table stored by the RAM 78 in order to obtain the home position. This figure assumes that the counter value is reset at the position where the edge of the home position pattern is detected when the picker unit 3 is driven downward. "Xhome" indicates the counter value at the position where the edge of the home position pattern is detected when the picker unit 3 is driven upward, while "Xhome2" indicates the middle value between "0" and the "Xhome", that is, a half of the value of the "Xhome".

Figure 13:
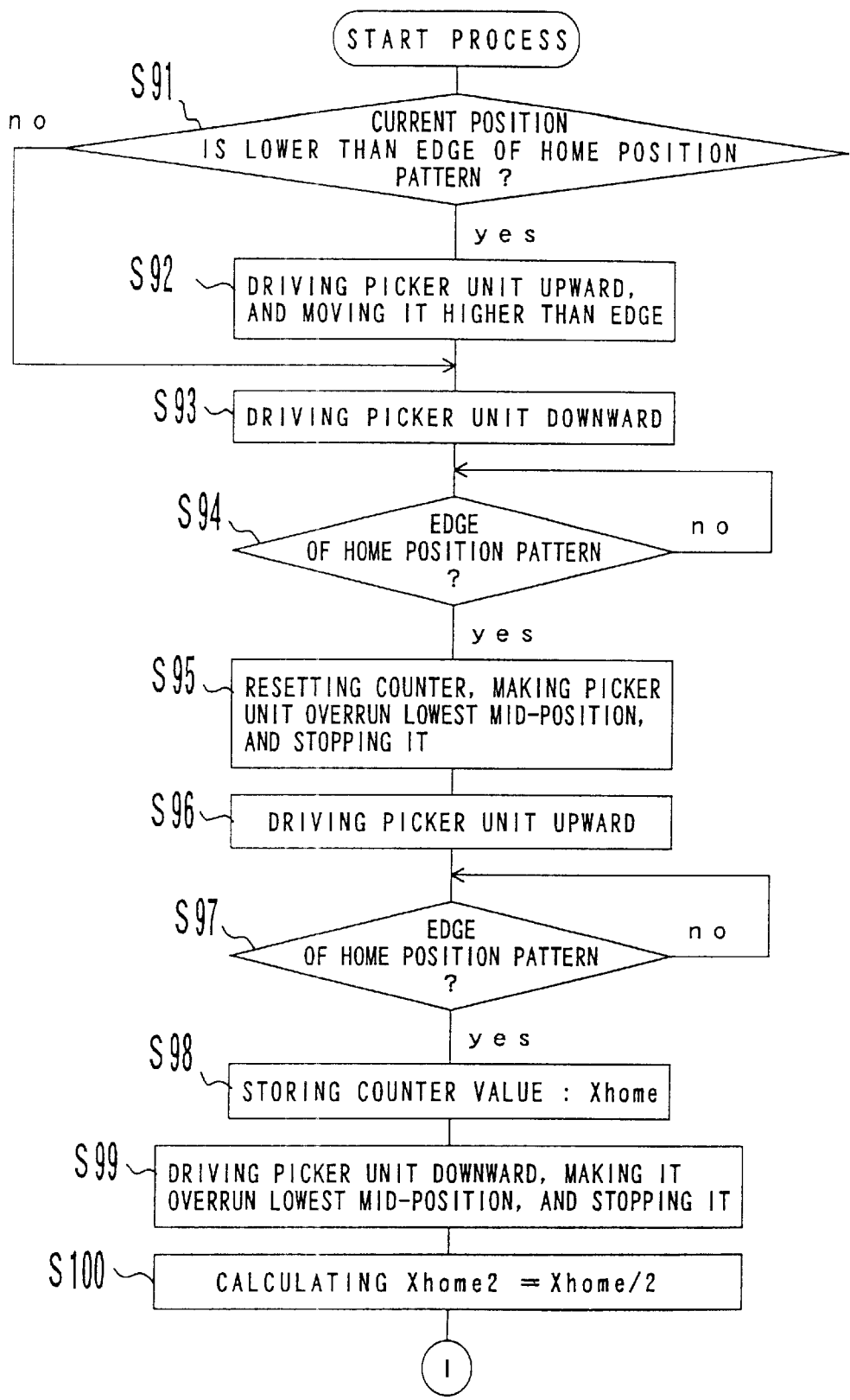
FIG. 13 is a flowchart 1 showing a second process for determining a position.

FIGS. 13 and 14 are flowcharts showing the second process for determining a position using the "Xhome2". Once the process is started, the MPU 76 determines whether or not the current position is lower than the edge of the home position pattern (step S91 of FIG. 13). If "YES", the MPU 76 drives the picker unit 3 upward, and moves it higher than the edge (step S92).

Next, the MPU 76 drives the picker unit 3 downward (step S93), and determines whether or not the edge of the home position pattern is detected (step S94). If "YES", the MPU 76 resets the up-and-down counter 48, makes the picker unit 3 overrun the lowest mid-position, and stops it (step S95).

Figure 15:
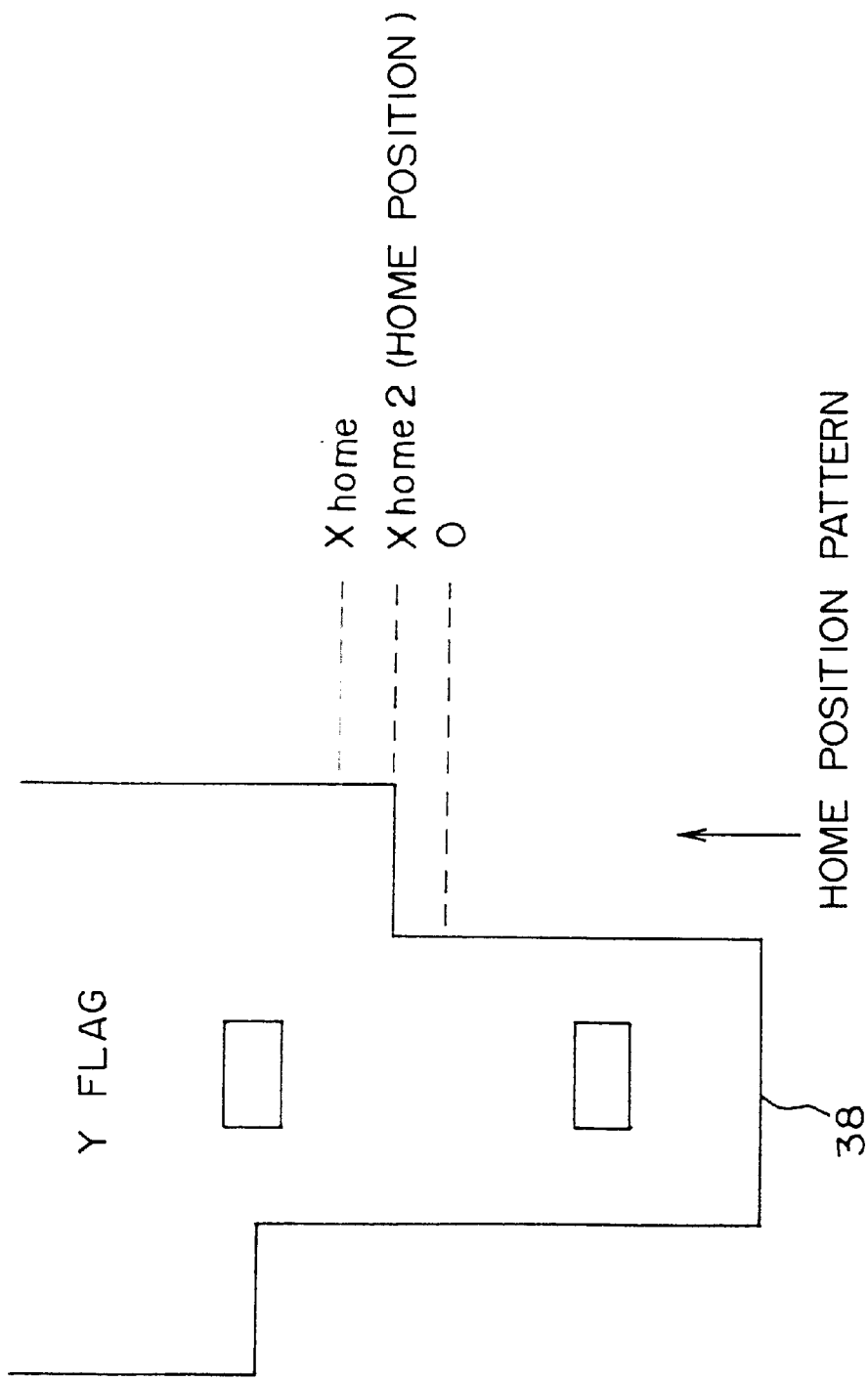
FIG. 15 shows the home position of a home position pattern.

At this time, a position somewhat different from the edge will correspond to the counter value "0", because of an error caused by a backlash. FIG. 15 shows the case in which the counter value is reset at a position lower than the edge.

Then, the MPU 76 drives the picker unit 3 upward (step S96), and determines whether or not the edge of the home position pattern is detected (step S97). If "YES", the MPU 76 recognizes the counter value at that time as "Xhome", and registers it to the table shown in FIG. 12 (step S98). Next, the MPU 76 drives the picker unit 3 downward, makes the picker unit 3 overrun the lowest mid-position, and stops it (step S99). In FIG. 15, a position somewhat higher than the edge will correspond to the counter value "Xhome" because of the error caused by a backlash.

The MPU 76 calculates "Xhome2=Xhome/2", and registers the result to the table shown in FIG. 12 (step S100). The obtained "Xhome2" indicates the correct edge position of the home position pattern as shown in FIG. 15.

The MPU 76 then drives the picker unit 3 upward (step S101 of FIG. 14), sets the control variable "k" to "0" (step S102), and determines whether or not the mid-position sensor is ON (step S103). When the mid-position sensor becomes ON, the MPU 76 recognizes the counter value at that time as "Xonu(k)", and registers it to the table shown in FIG. 10 (step S104). Then, the MPU 76 determines whether or not the mid-position sensor is OFF (step S105). When the mid-position sensor becomes OFF, the MPU 76 recognizes the counter value at that time as "Xofu(k)", and registers it to the table shown in FIG. 10 (step S106).

Next, the MPU 76 sets "k=k+1" (step S107), and determines whether or not the value of "k" exceeds the value corresponding to the uppermost value "34" (step S108). If "NO", the MPU repeats the process in and after step S103.

If the value of "k" is larger than "34" in step S108, the MPU 76 drives the picker unit 3 downward (step S109) and sets "k=k−1" (step S110). Then, the MPU 76 determines whether or not the mid-position sensor is ON (step S111). When the mid-position sensor becomes ON, the MPU 76 recognizes the counter value at that time as "Xond(k)", and registers it to the table shown in FIG. 10 (step S112). Next, the MPU 76 determines whether or not the mid-position sensor is OFF (step S113). When the mid-position sensor becomes OFF, the MPU 76 recognizes the counter value at that time as "Xofd(k)", and registers it to the table shown in FIG. 10 (step S114).

The MPU 76 then determines whether or not the value of "k" is "0" (step S115). If NO, the MPU 76 repeats the process in and after step S110. When the value of "k" becomes "0", the MPU 76 calculates "Xon(k)=[Xonu(k)+Xond(k)]/2" for each of the values of "k" from 0 to 34, and obtains the middle value "Xon(k)" (step S116).

Next, the MPU 76 corrects the "Xon(k)" using the "Xhome2" (step S117), and terminates the process. The "Xon(k)" (k=0, 1, . . . , 34) is corrected to be "Xon(k)=Xon(k)−Xhome2", and registered to the table shown in FIG. 10 as the counter value at each stop position.

Although the middle value "Xon(k)" is obtained as the stop position in step S116 of FIG. 14, "Xof(k)=[Xofu(k)+Xofd(k)]/2" may be obtained alternatively. The "Xof(k)" is corrected by the "Xhome2" in a similar manner as in the "Xon(k)", and used as the counter value at each stop position. Furthermore, the middle value X(k) between the corrected "Xon(k)" and "Xof(k)" may be used as the counter value at each stop position.

By including in such a program such as the first or second process for determining a position, a stop position is determined by absorbing an error even if a backlash exists and backlash is introduced when a mechanism is assembled, or even if long term changes occur. As a result, the stop accuracy is improved. Furthermore, there will be no need to use expensive gears/belts, or to make a subtle operation adjustments in order to eliminate such backlash, thereby contributing to the reduction of hardware cost and the load on assembly operations.

The above described embodiment uses the ratio of an actually measured value of the entire stroke and its design value in order to estimate an actual stop position of the hand unit 4. However, the present invention is not limited to the above described implementation. A suitable reference position may be arranged within a range where the hand unit 4 can move, and the ratio of an actually measured value of the distance from the home position to the reference position, to its design value, may be obtained in order to correct the counter value at another stop position by using the obtained ratio.

Additionally, the Y flag 38 and Y sensor 39 are used to detect the stop position of the picker unit 3. However, another sensor may be attached to the Y unit in order to detect the stop position. Furthermore, the encoders 18, 47, and 74 for detecting the amount of a move are not limited to one using a photo-interrupter. An arbitrary rotary encoder may be used.

Still further, the present invention is not limited to position control of an accessor of a library device only. It can be applied to position control of an arbitrary moving unit for performing predetermined operations, such as an industrial robot, etc.

According to the present invention, the stop position of a mechanism in an accessor which transports a storage medium can be accurately determined. Additionally, the determination of the stop position is automatically made by using a minimal hardware configuration, thereby contributing to the reduction of hardware cost and a workload.

What is claimed is:

1. A position controlling device for use in a library device which stores a plurality of storage media and includes an automatic transporting unit for transporting a storage medium, comprising:

driving means for driving said automatic transporting unit;

move amount detecting means for detecting an amount of a move of said automatic transporting unit;

storing means for storing predetermined first distance data beforehand; and controlling means for correcting position data of said automatic transporting unit using a ratio of second distance data to the first distance data, said second distance data being obtained from said move amount detecting means and corresponding to the first distance data, and said controlling means controlling said driving means using the corrected position data, wherein:

said storing means stores data of a design value of a stroke of said automatic transporting unit as the first distance data; and said move amount detecting means detects data of an actual value of the stroke of said automatic transporting unit as the second distance data.

2. A position controlling device for use in a library device which stores a plurality of storage media and includes an automatic transporting unit for transporting a storage medium, comprising:

driving means for driving said automatic transporting unit;

move amount detecting means for detecting an amount of a move of said automatic transporting unit;

storing means for storing predetermined first distance data beforehand; and controlling means for correcting position data of said automatic transporting unit using a ratio of second distance data to the first distance data, said second distance data being obtained from said move amount detecting means and corresponding to the first distance data, and said controlling means controlling said driving means using the corrected position data, wherein:

said automatic transporting unit includes a hand means for holding a storage medium;

said storing means stores data of a design value of a stroke of said hand means as the first distance data;

said move amount detecting means detects data of an actual value of the stroke of the hand means as the second distance data; and said controlling means corrects position data of said hand means using the ratio.

3. The position controlling device according to claim 1, wherein said controlling means makes a comparison between the first and second distance data, and detects an abnormal state in the library device based on a result of the comparison.

4. The position controlling device according to claim 1, wherein said move amount detecting means is attached to said driving means.

5. A position controlling device for controlling a position of a moving unit which performs a predetermined operation, comprising:

driving means for driving said moving unit;

move amount detecting means for detecting an amount of a move of said moving unit;

storing means for storing predetermined first distance data beforehand; and controlling means for correcting position data of said moving unit using a ratio of second distance data to the first distance data, said second distance data being obtained from said move amount detecting means and corresponding to the first distance data, and said controlling means controlling said driving means using the corrected position data, wherein:

said storing means stores data of a design value of a stroke of said moving unit as the first distance data; and said move amount detecting means detects data of an actual value of the stroke of said moving unit as the second distance data.

6. The position controlling device according to claim 5, wherein said move amount detecting means is attached to said driving means.

7. A library device, comprising:

media storing means for storing a plurality of storage media;

automatic transporting means for transporting a storage medium;

driving means for driving said automatic transporting means;

move amount detecting means for detecting an amount of a move of said automatic transporting means;

storing means for storing predetermined first distance data beforehand; and controlling means for correcting position data of said automatic transporting means using a ratio of second distance data to the first distance data, said second distance data being obtained from said move amount detecting means and corresponding to the first distance data, and said controlling means controlling said driving means using the corrected position data, wherein:

said storing means stores data of a design value of a stroke of said automatic transporting means as the first distance data; and said move amount detecting means detects data of an actual value of the stroke of said automatic transporting means as the second distance data.

8. The position controlling device according to claim 7, wherein said move amount detecting means is attached to said driving means.

9. A position controlling device for use in a library device which stores a plurality of storage media and includes an automatic transporting unit for transporting a storage medium, comprising:

driving means for driving said automatic transporting unit;

move amount detecting means for detecting an amount of a move of said automatic transporting unit;

position detecting means for detecting a particular position of said automatic transporting unit; and controlling means for controlling said automatic transporting unit to move in two or more directions, generating position data for control using two or more position data which are respectively obtained from said move amount detecting means when the particular position is detected while said automatic transporting unit is traveling in each direction of the two or more directions, and controlling said driving means using the position data for control, wherein:

said position detecting means includes a flag means for specifying the particular position and a sensor means for scanning said flag means in correspondence with a move of said automatic transporting unit; and said controlling means generates the position data for control corresponding to the particular position using position data when said automatic transporting unit is driven upward and position data when said automatic transporting unit is driven downward.

10. The position controlling device according to claim 9, wherein said move amount detecting means is attached to said driving means.

11. The position controlling device according to claim 9, wherein said position detecting means detects at least one of a home position and one or more stop positions of said automatic transporting unit as the particular position.

12. The position controlling device according to claim 9, wherein said controlling means generates an average value of the two or more position data as the position data for control.

13. A position controlling device for controlling a position of a moving unit which performs a predetermined operation, comprising:

driving means for driving said moving unit;

move amount detecting means for detecting an amount of a move of said moving unit;

position detecting means for detecting a particular position of said moving unit; and controlling means for controlling said moving unit to move in two or more directions, generating position data for control using two or more position data which are respectively obtained from said move amount detecting means when the particular position is detected while said automatic transporting unit is traveling in each direction of the two or more directions, and controlling said driving means using the position data for control, wherein:

said position detecting means includes a flag means for specifying the particular position and a sensor means for scanning said flag means in correspondence with a move of said moving unit; and said controlling means generates the position data for control corresponding to the particular position using position data when said moving unit is driven upward and position data when said moving unit is driven downward.

14. The position controlling device according to claim 13, wherein said move amount detecting means is attached to said driving means.

15. A library device, comprising:

media storing means for storing a plurality of storage media;

automatic transporting means for transporting a storage medium;

driving means for driving said automatic transporting means;

move amount detecting means for detecting an amount of a move of said automatic transporting means;

position detecting means for detecting a particular position of said automatic transporting means; and controlling means for controlling said automatic transporting means to move in two or more directions, generating position data for control using two or more position data which are respectively obtained from said move amount detecting means when the particular position is obtained while said automatic transporting means is traveling in each direction of the two or more directions, and controlling said driving means using the position data for control, wherein:

said position detecting means includes a flag means for specifying the particular position and a sensor means for scanning said flag means in correspondence with a move of said automatic transporting means; and said controlling means generates the position data for control corresponding to the particular position using position data when said automatic transporting means is driven upward and position data when said automatic transporting means is driven downward.

16. The position controlling device according to claim 15, wherein said move amount detecting means is attached to said driving means.

17. A readable storage medium, when used by a processing unit of a library device which stores a plurality of storage media, and includes an automatic transporting unit which transports a storage medium, for making the processing unit perform the functions of:

storing predetermined first distance data beforehand;

correcting position data of said automatic transporting unit using a ratio of second distance data to the first distance data, said second distance data corresponding to the first distance data and indicating an amount of a move of said automatic transporting unit; and controlling said automatic transporting unit using the corrected position data, wherein:

data of a design value of a stroke of said automatic transporting unit are stored as the first distance data; and data of an actual value of the stroke of said automatic transporting unit are used as the second distance data.

18. A readable storage medium, when used by a processing device for controlling a moving unit which performs a predetermined operation, for making the processing device perform the functions of:

storing predetermined first distance data beforehand;

correcting position data of said moving unit using a ratio of second distance data to the first distance data, said second distance data corresponding to the first distance data and indicating an amount of a move of said moving unit; and controlling said moving unit using the corrected position data, wherein:

data of a design value of a stroke of said moving unit are stored as the first distance data; and data of an actual value of the stroke of said moving unit are used as the second distance data.

19. A readable storage medium, when used by a processing unit of a library device which stores a plurality of storage media, and includes an automatic transporting unit for transporting a storage medium, for making the processing unit perform the functions of:

controlling said automatic transporting unit to move in two or more directions;

generating position data for control using two or more position data which are respectively obtained when a particular position is detected while said automatic transporting unit is traveling in each direction of the two or more directions; and controlling said automatic transporting unit using the position data for control, wherein:

said library device includes a flag means for specifying the particular position and a sensor means for scanning said flag means in correspondence with a move of said automatic transporting unit; and the position data for control corresponding to the particular position are generated using position data when said automatic transporting unit is driven upward and position data when said automatic transporting unit is driven downward.

20. A readable storage medium, when used by a processing device for controlling a moving unit which performs a predetermined operation, for making the processing device perform the functions of:

controlling said moving unit to move in two or more directions;

generating position data for control using two or more position data which are respectively obtained when a particular position is detected while said moving unit is traveling in each direction of the two or more directions; and controlling said moving unit using the position data for control, wherein:

said library device includes a flag means for specifying the particular position and sensor means for scanning said flag means in correspondence with a move of said moving unit; and the position data for control corresponding to the particular position are generated using position data when said moving unit is driven upward and position data when said moving unit is driven downward.

21. A position controlling method for use in a library device which stores a plurality of storage media, and includes an automatic transporting unit which transports a storage medium, comprising the steps of:

predetermining first distance data beforehand;

correcting position data of said automatic transporting unit using a ratio of second distance data to the first distance data, said second distance data corresponding to the first distance data and indicating an amount of a move of said automatic transporting unit; and controlling said automatic transporting unit using the corrected position data, wherein:

data of a design value of a stroke of said automatic transporting unit are stored as the first distance data; and data of an actual value of the stroke of said automatic transporting unit are used as the second distance data.

22. The position controlling method according to claim 21, further comprising the step of:

making a comparison between the first and second distance data, and detecting an abnormal state of the library device based on a result of the comparison.

23. A position controlling method for controlling a moving unit which performs a predetermined operation, comprising the steps of:

predetermining first distance data beforehand;

correcting position data of said moving unit using a ratio of second distance data to the first distance data, said second distance data corresponding to the first distance data and indicating an amount of a move of said moving unit; and controlling said moving unit using the corrected position data, wherein:

data of a design value of a stroke of said moving unit are stored as the first distance data; and data of an actual of the stroke of said moving unit are used as the second distance data.

24. A position controlling method for use in a library device which stores a plurality of storage media, and includes an automatic transporting unit for transporting a storage medium, comprising the steps of:

controlling said automatic transporting unit to move in two or more directions;

generating position data for control using two or more position data which are respectively obtained when a particular position is detected while said automatic transporting unit is traveling in each direction of the two or more directions; and controlling said automatic transporting unit using the position data for control, wherein:

said library device includes a flag means for specifying the particular position and a sensor means for scanning said flag means in correspondence with a move of said automatic transporting unit; and the position data for control corresponding to the particular position are generated using position data when said automatic transporting unit is driven upward and position data when said automatic transporting unit is driven downward.

25. A position controlling method for controlling a moving unit which performs a predetermined operation, comprising the steps of:

controlling said moving unit to move in two or more directions;

generating position data for control using two or more position data which are respectively obtained when a particular position is detected while said moving unit is traveling in each direction of the two or more directions; and controlling said moving unit using the position data for control, wherein:

said library device includes a flag means for specifying the particular position and sensor means for scanning said flag means in correspondence with a move of said moving unit; and the position data for control corresponding to the particular position are generated using positing data when said moving unit is driven upward and position data when said moving unit is driven downward.

* * * * *

UNITED STATES PATENT AND TRADEMARK OFFICE
CERTIFICATE OF CORRECTION

PATENT NO. : 6,385,142 B1
DATED : May 7, 2002
INVENTOR(S) : Kobayashi

It is certified that error appears in the above-identified patent and that said Letters Patent is hereby corrected as shown below:

Title page,
Item [56], References Cited, OTHER PUBLICATIONS, please insert the missing article, -- Taylor, R.H., METHOD FOR CALIBRATION OF POSITION SERVO DEVICES, IBM Technical Disclosure Bulletin; Vol. 26 No. 4, September 1983, pgs. 1818-1820 --

Column 22,
Line 39, please replace "positing" with -- position --

Signed and Sealed this

Fifteenth Day of April, 2003

JAMES E. ROGAN
*Director of the United States Patent and Trademark Office*